United States Patent [19]

Thompson

[11] 3,733,589

[45] May 15, 1973

[54] DATA LOCATING DEVICE

[75] Inventor: Thomas Raymond Thompson, Rickmansworth, England

[73] Assignee: Shell-Mex and B. P. Limited, London, England

[22] Filed: Sept. 15, 1970

[21] Appl. No.: 72,261

[30] Foreign Application Priority Data

Sept. 15, 1969 Great Britain....................45,338/69

[52] U.S. Cl..........................340/173 AM, 340/172.5

[51] Int. Cl. ..........................................G11c 15/00

[58] Field of Search...............340/173 AM, 174 AM, 340/172.5

[56] References Cited

UNITED STATES PATENTS 3,018,956 1/1962 Hosier et al..................340/173 AM 3,548,385 12/1970 Tunis................................340/172.5

OTHER PUBLICATIONS

IBM Technical Disclosure Bulletin, "Hybrid Associative Memory" by Weinberger, Vol. 11, No. 12, 5/69 pages 1744–1745.

IEEE Transactions On Computors "A Preprocessing High Speed Memory System" by Kuck, Vol. C–19, No. 9, 9/70, pages 793–800.

IEEE Transactions on Electronic ic Computers, "-Plated Wire Content–Addressable Memories with Bit–Steering Technique" by Chow, Vol. EC16; No. 5; 10/67; p. 642–652.

*Primary Examiner*—Stanley M. Urynowicz, Jr.

*Attorney*—Cushman, Darby & Cushman

[57] ABSTRACT

A data locating device for locating specific data from a store of data organized under a plurality of keywords arranged in a predetermined sequence, the device comprising apparatus for producing a plurality of electrical signals representing at least two successive characters of a keyword under which the said specific data is held in said data store, and apparatus for combining the electrical signals and, responsive to said combination, for producing a group of electrical signals representative of the location of the said specific data in said data store.

12 Claims, 19 Drawing Figures

Patented May 15, 1973 3,733,589

18 Sheets-Sheet 2

DATA LOCATING DEVICE

The present invention relates to a data locating device.

More particularly, the invention relates to a device for locating specific data from a store of data by reference to a keyword or name under which the specific data appears.

In the field of data retrieval, the provision of means for accessing specific data from a mass of data held in a store (hereinafter termed "the data store") with comparative ease and speed is a continuing problem which the present invention seeks to minimize.

A data store conveniently may be organized as a directory which, in its simplest form, contains a number of pages listing keywords or names relating to a single category or class of information and to locate a page on which a specific name can be expected to appear, the first, or the first and second, or the first, second, and third etc. letters of the specific keyword or name are compared with those appearing at the beginning and end of successive pages of the directory. If the first letter of the specific name in the alphabet is earlier than the first letter of the first name appearing on a page, reference must be made to an earlier page, and if later in the alphabet than the first letter of the last name appearing on a page, reference must be made to a later page. When the first letter of the specific name is later than that for the first name on the page, and earlier than that for the last name on the page, the specific name should appear on that page. If, on the other hand, the first letter is the same for either of these cases, then the same examination must be made in respect of the second letter of the specific name and so on as far as necessary until the page has been determined.

In a more complicated structure, the directory may be organized into a number of categories of information which need not necessarily be homogenous and reference must first be had to a particular category before referring to the specific name within the category. These two aspects constitute "levels" of definition within the organization of the directory in which the category constitutes a first "level" and the name constitutes a second "level". Additionally, the name itself may contain components distinguishing it from similar names, for example a surname can be distinguished by a forename or by initials. These components constitute lower "levels" of definition within the directory organization.

The specific keyword or name will normally be one or more identifying words at different levels, but analogously, it could be a group of letters or a multi-digit number. punctuation also, can be included.

According to the present invention there is provided a data locating device for locating specific data from a store of data, the device comprising means for producing at least two electrical signals respectively representing at least two successive characters of a keyword under which the said specific data is held in said data store, means for combining said signals, and means for detecting said combination and operable in response thereto to produce an output electrical signal representative of the location of the said specific data in said data store.

For convenience, the present invention will hereinafter be described in connection with its use in a system in which there is a need to locate specific data in a data store organized into a number of directories, for example three, in which each directory contains a different category of information to the other directories. The structure and organization of each directory may differ from that of the others, but essentially, reference to a required item of information within each directory can be had by reference to keywords or names at different levels under which particulars relating to those keywords or names are to be found.

Two embodiments of the invention are to be described and each includes an "indexing" arrangement, the construction of which is governed entirely in dependence on the structure and organization of the data store with which the data locating device of the invention is to be used.

In common with all data storage systems, the data store is compiled as logically and as simply as possible, having regard to the nature and amount of information which the store is expected to hold. Details of the manner in which such a data store is compiled are not strictly relevant in understanding the present invention, and no description will therefore be given, but it should be borne in mind that the construction of the above mentioned "indexing" arrangement, to be described later, will be directly related to the structure and organization of the data store with which it is to be put to use.

Examples of the present invention will now be described with reference to the accompanying drawings in which.

Figure 1:
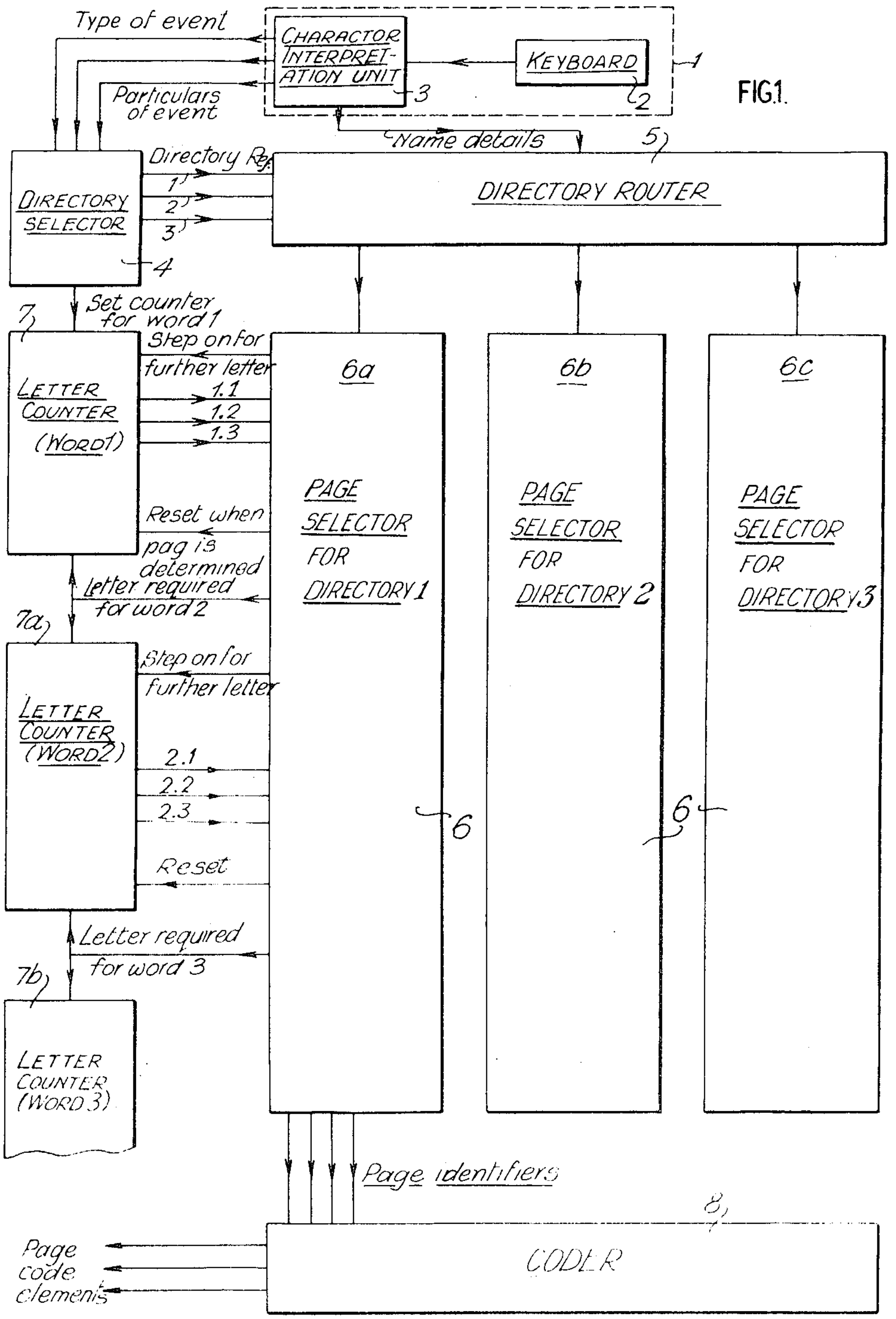
FIG. 1 is a block schematic diagram of a first embodiment of the invention.
Figure 3:
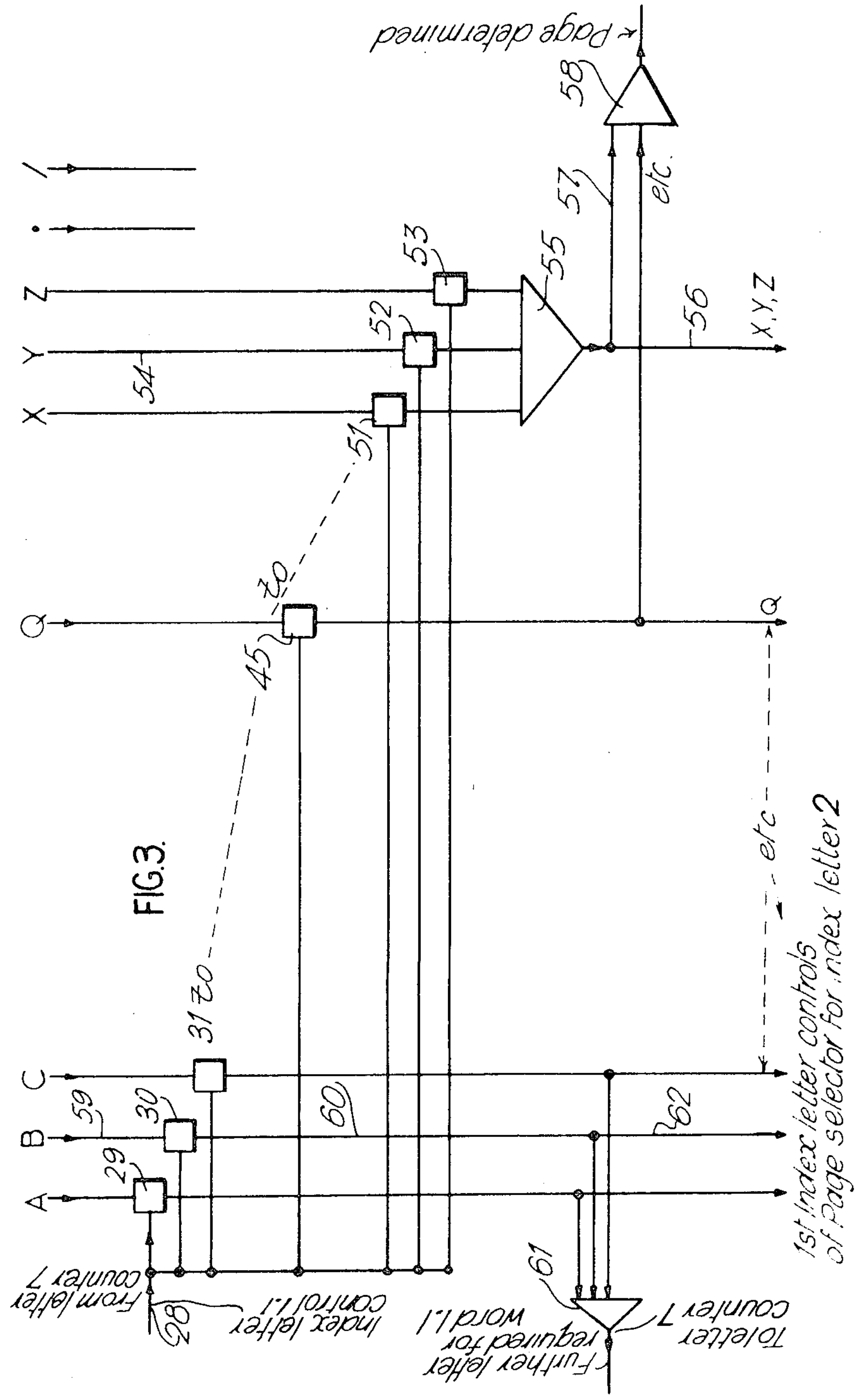
Figure 4A:
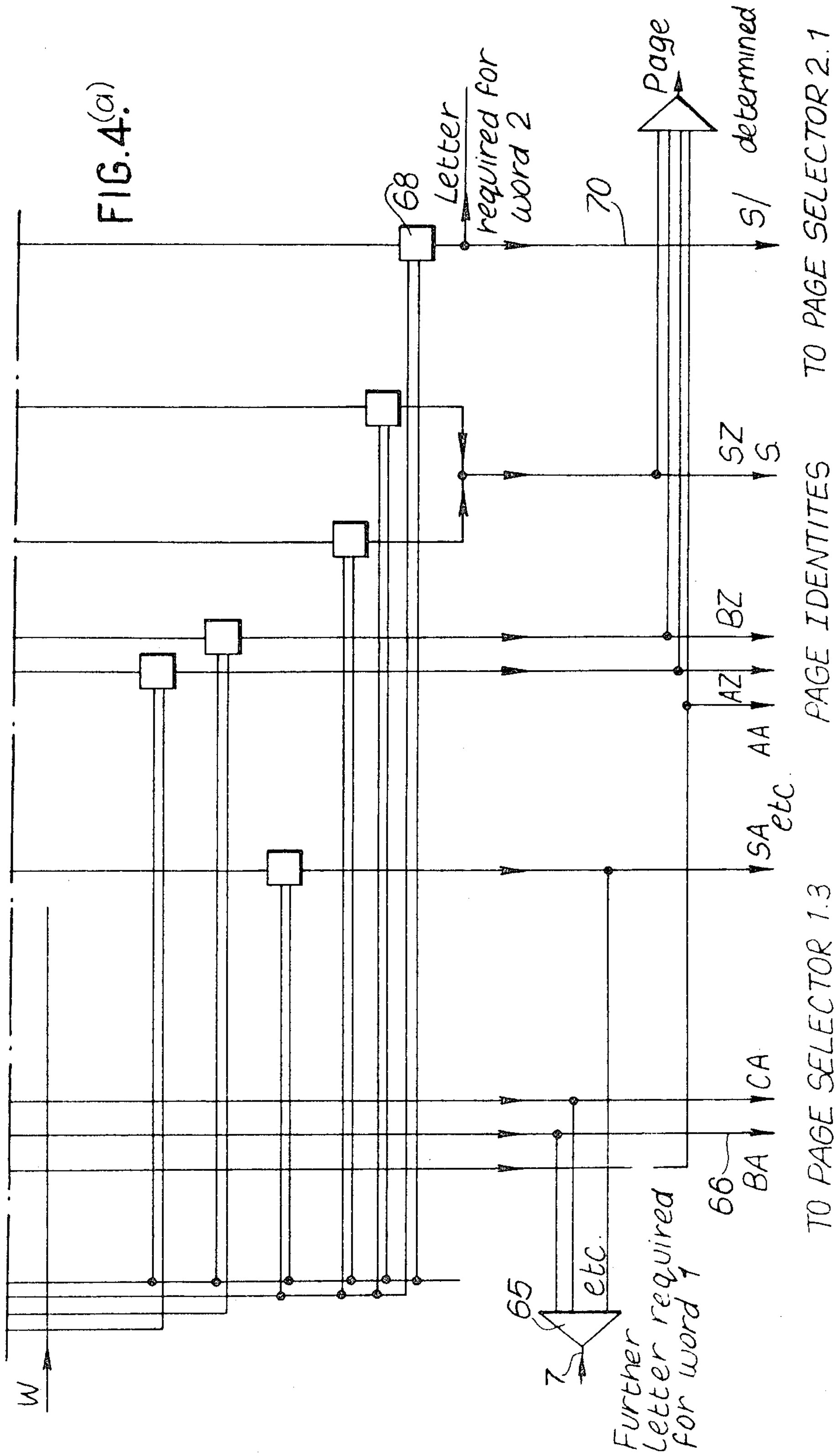
Figure 4:
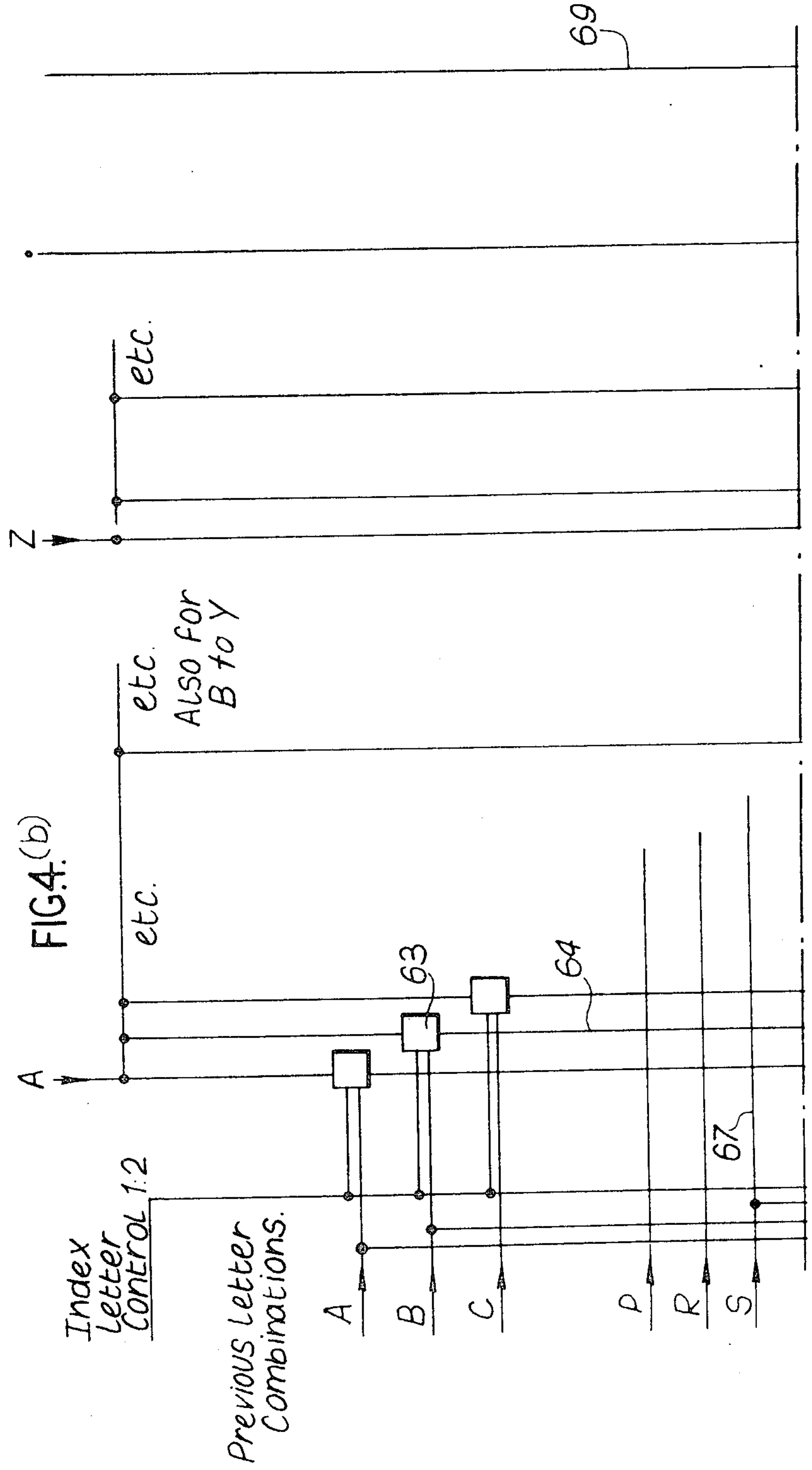
Figure 5:
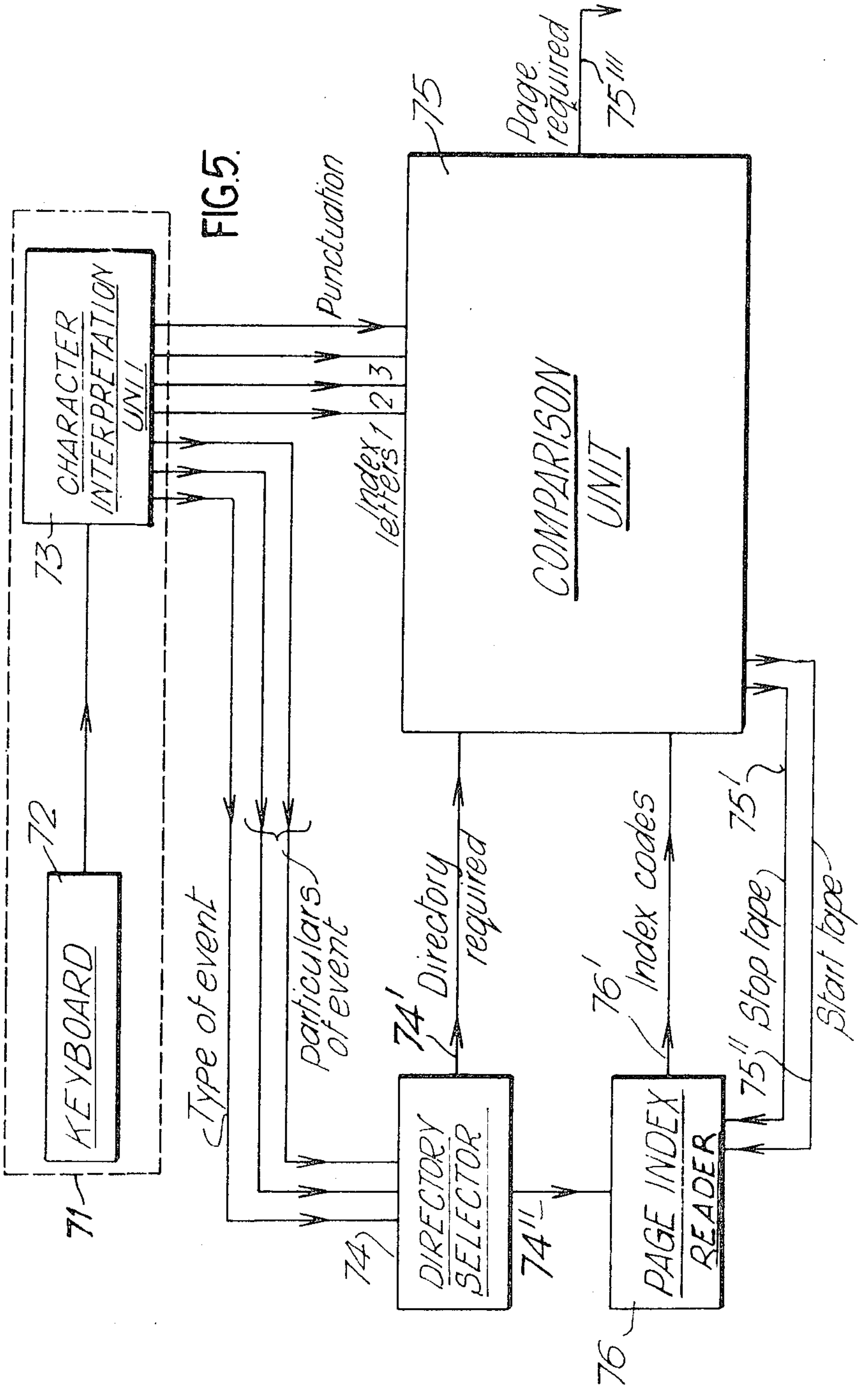
Figure 6A:
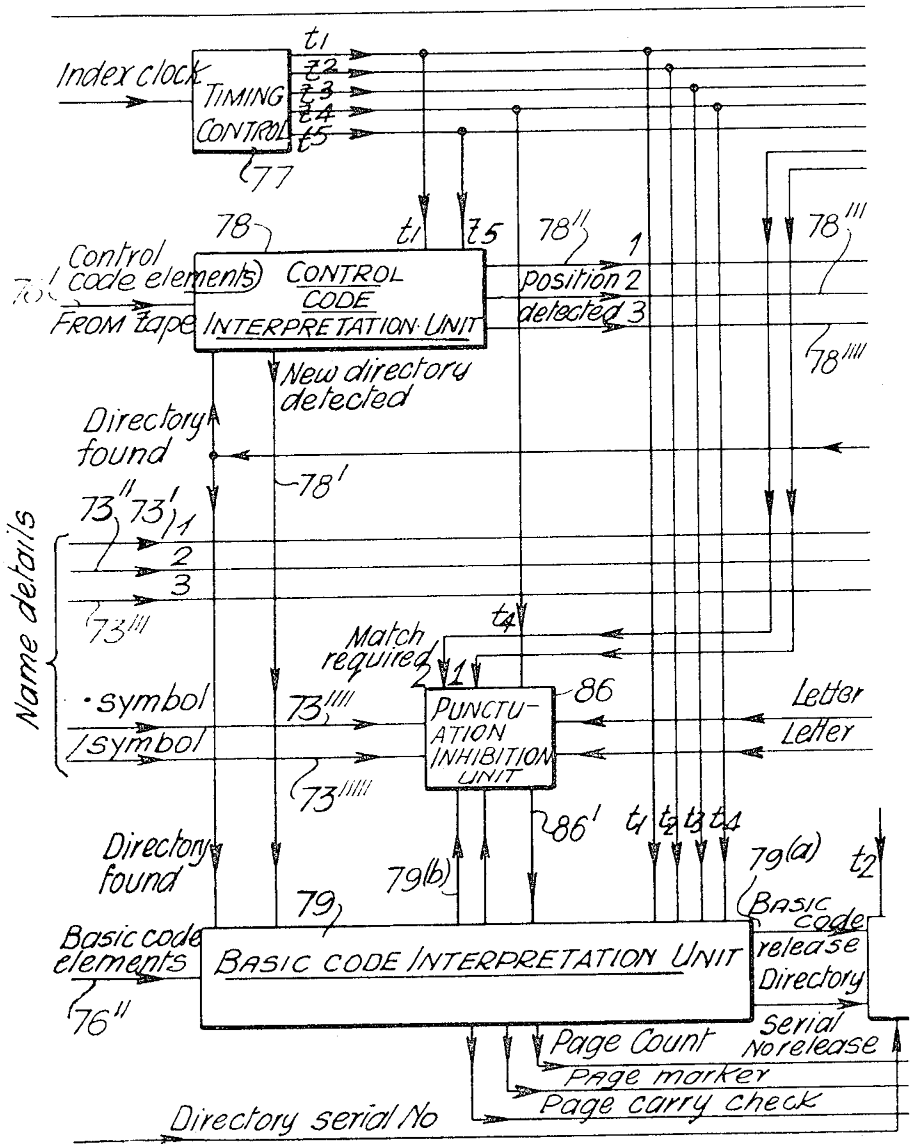
Figure 6B:
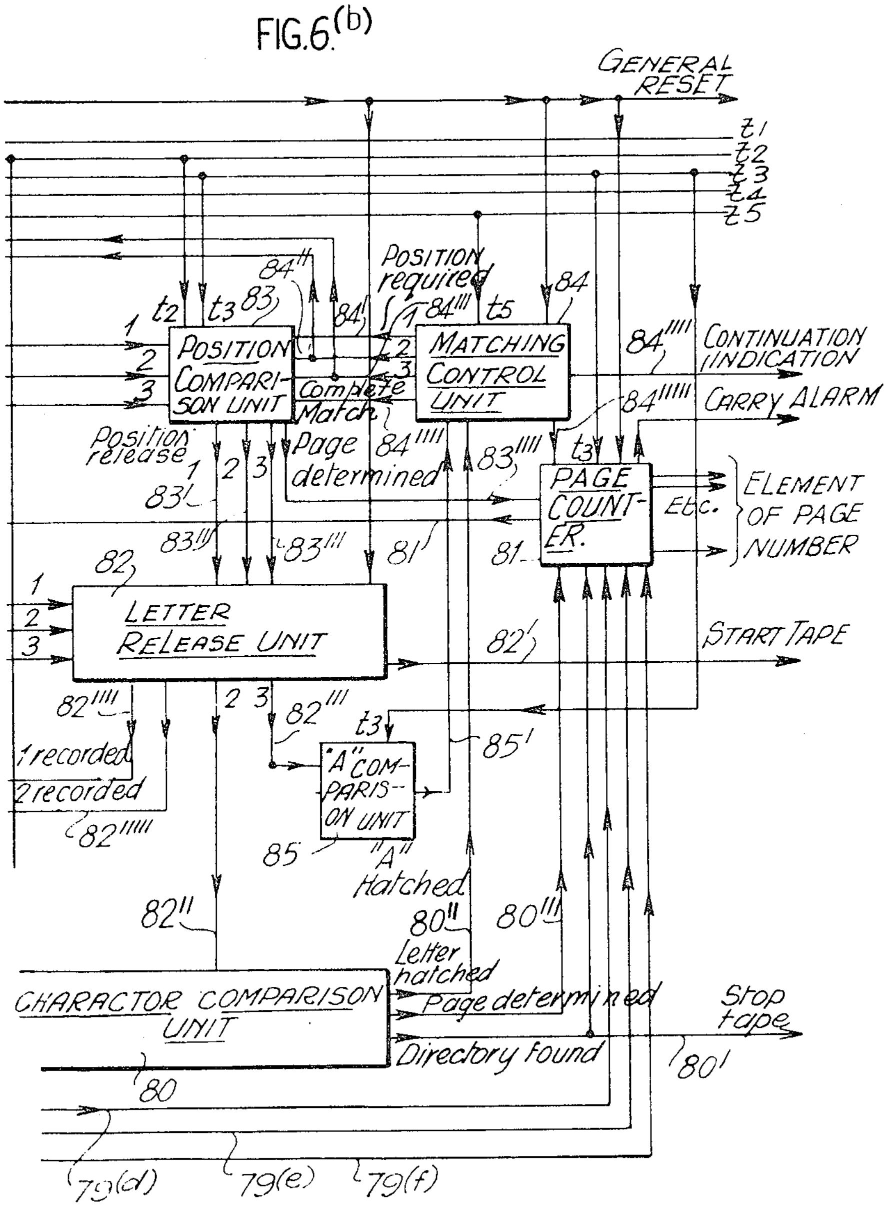
Figure 7:
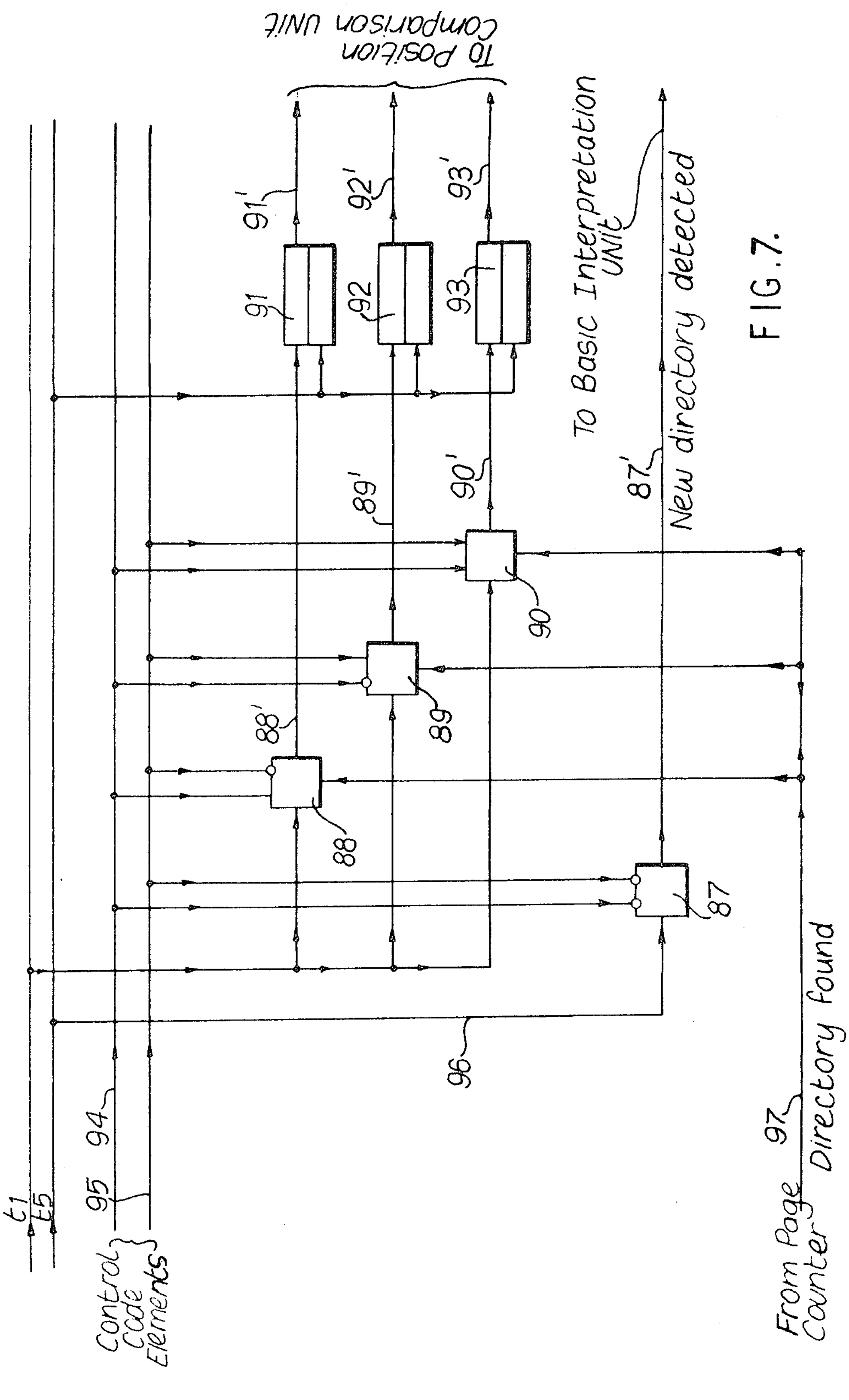
Figure 8:
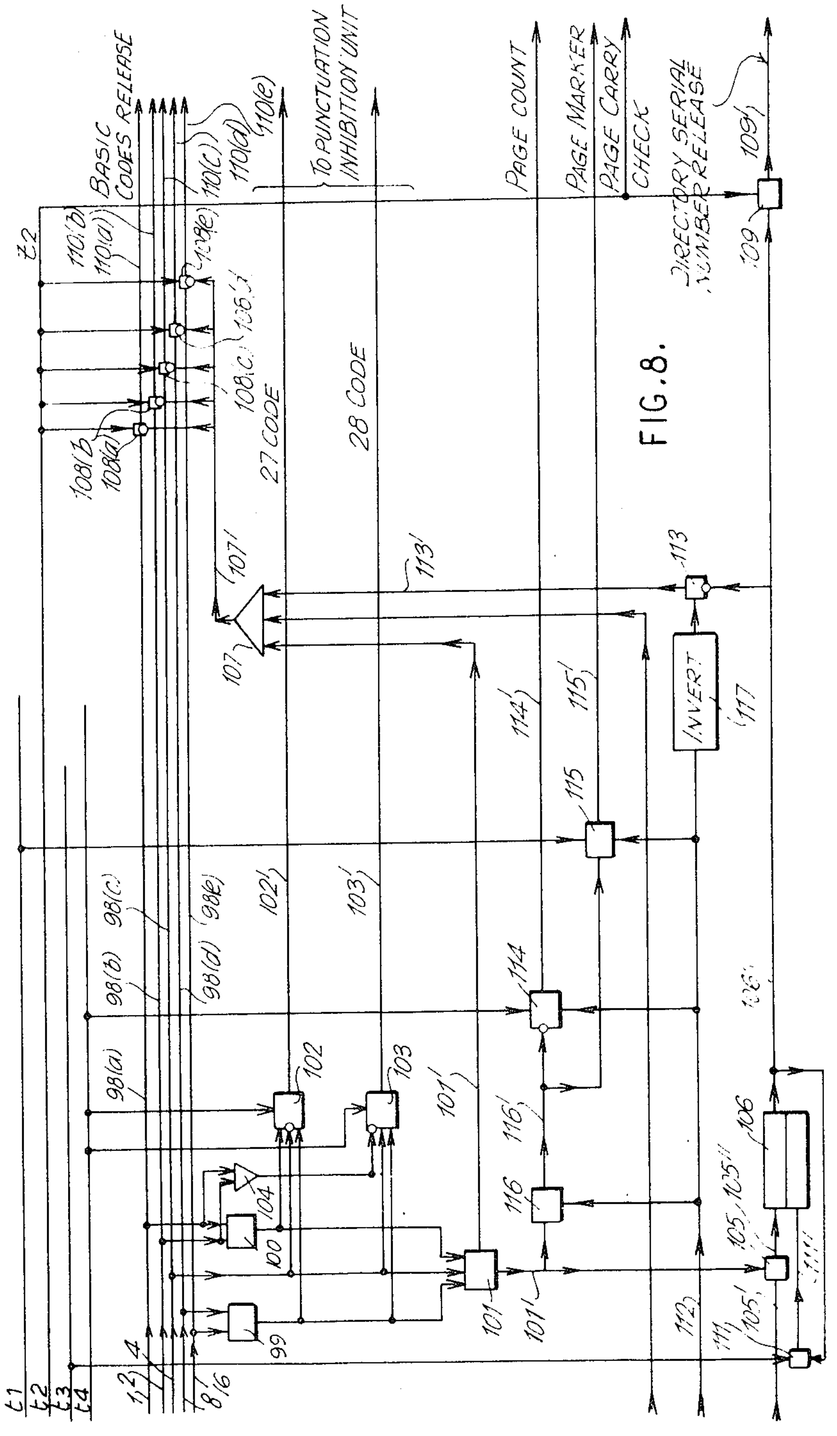
Figure 9:
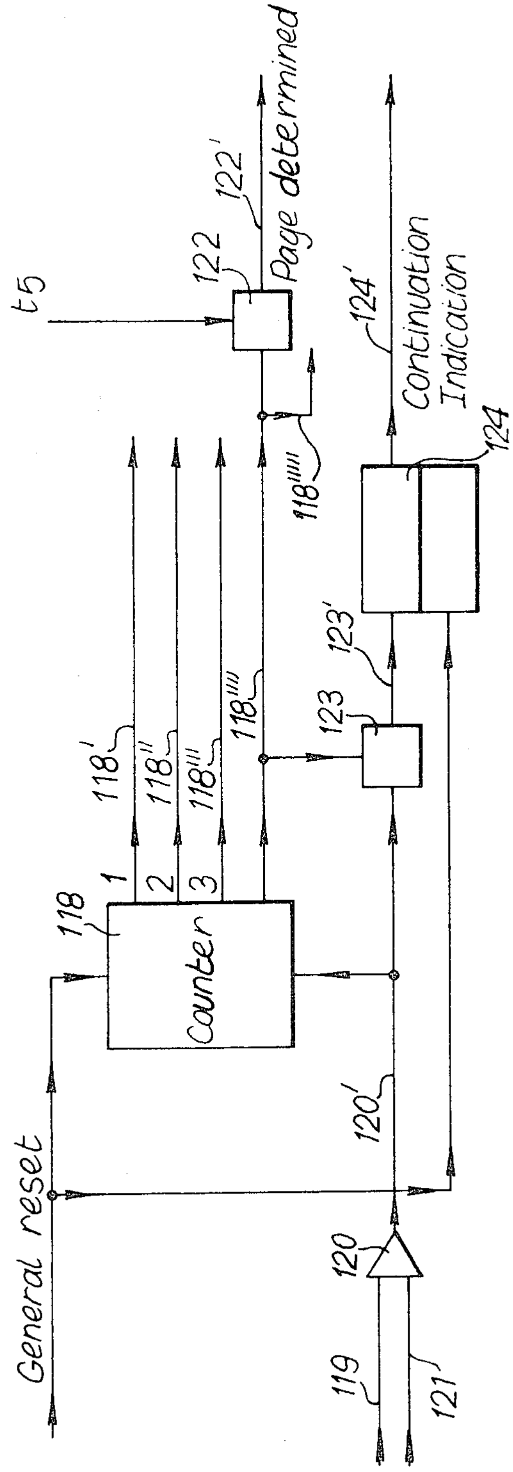
Figure 10:
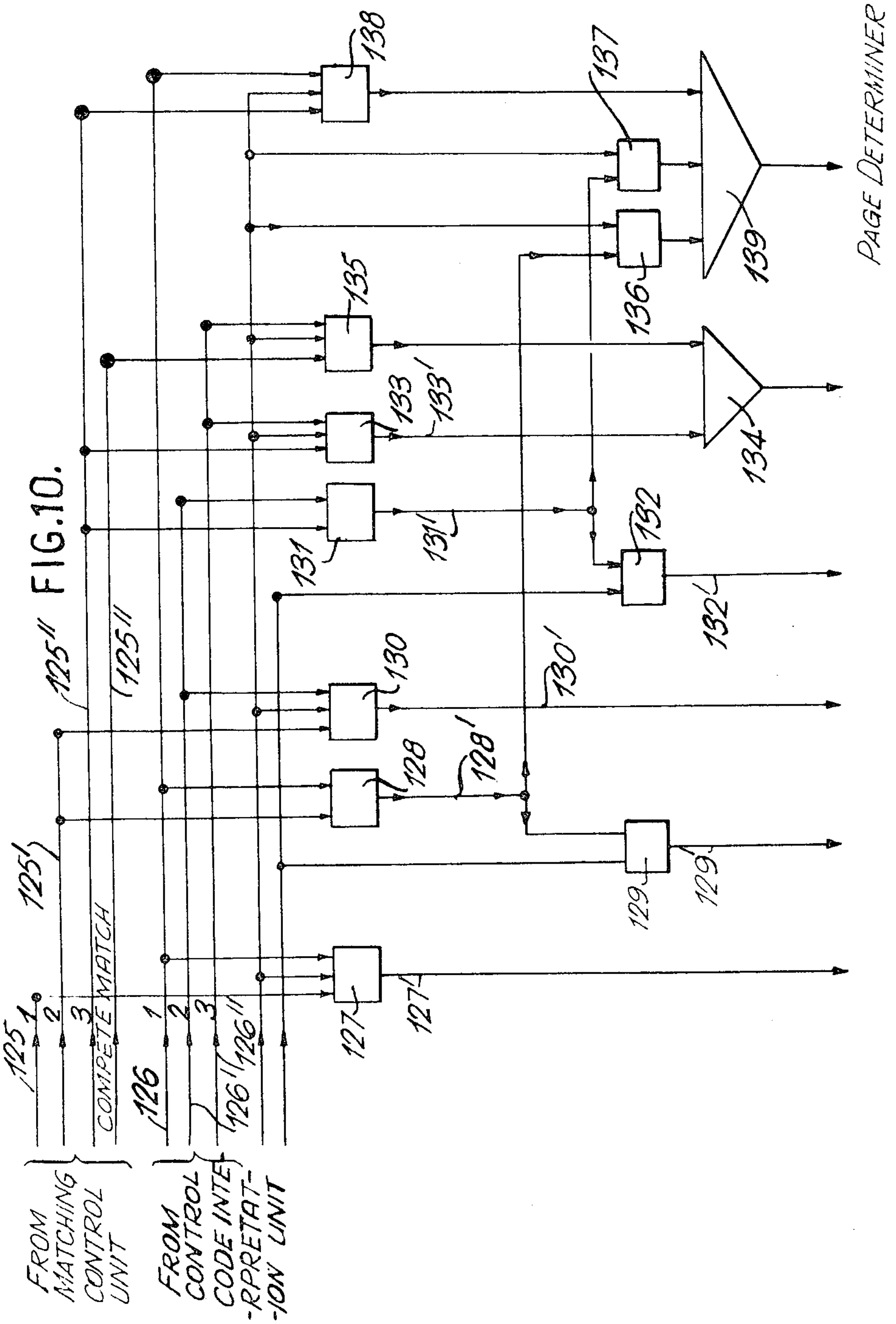
Figure 11:
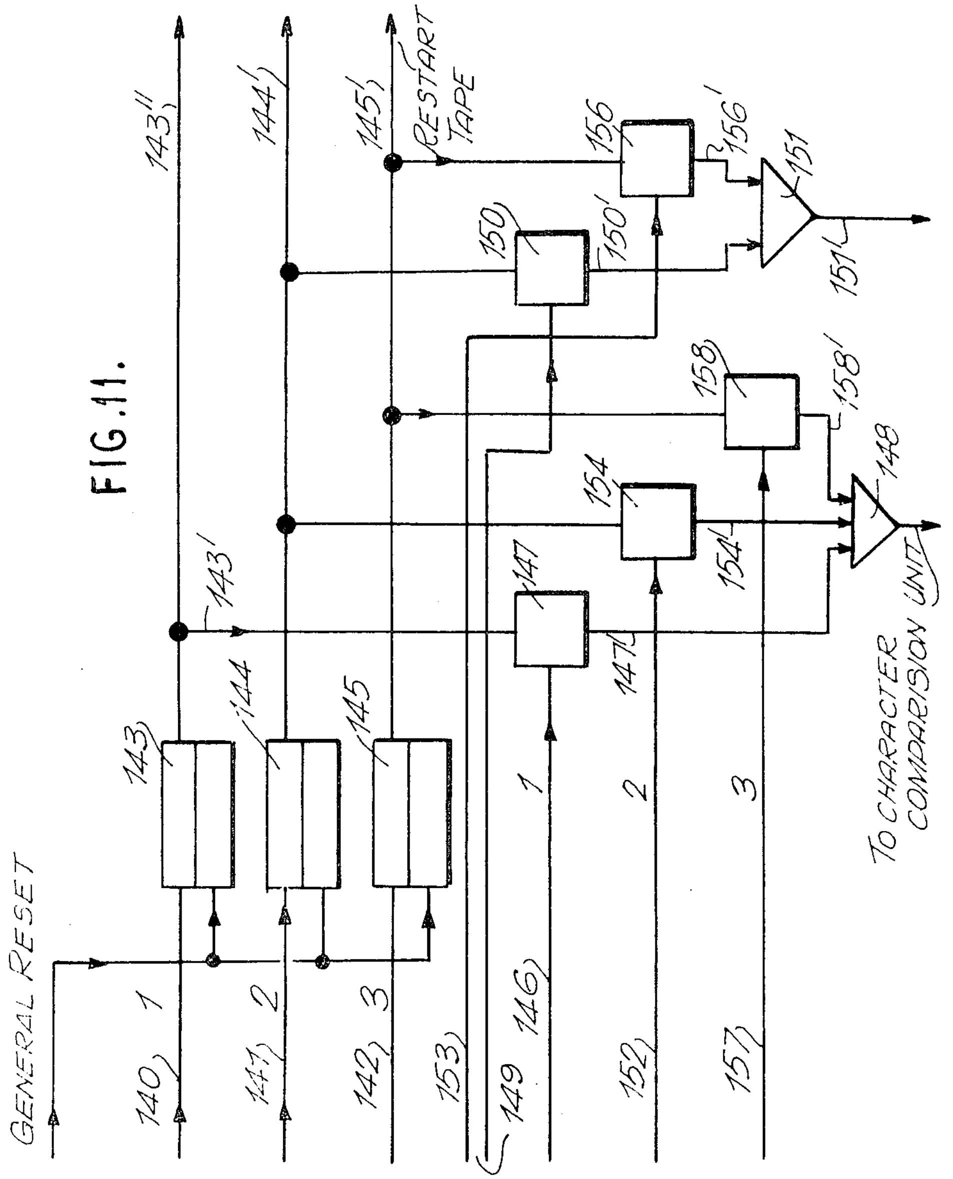
Figure 12:
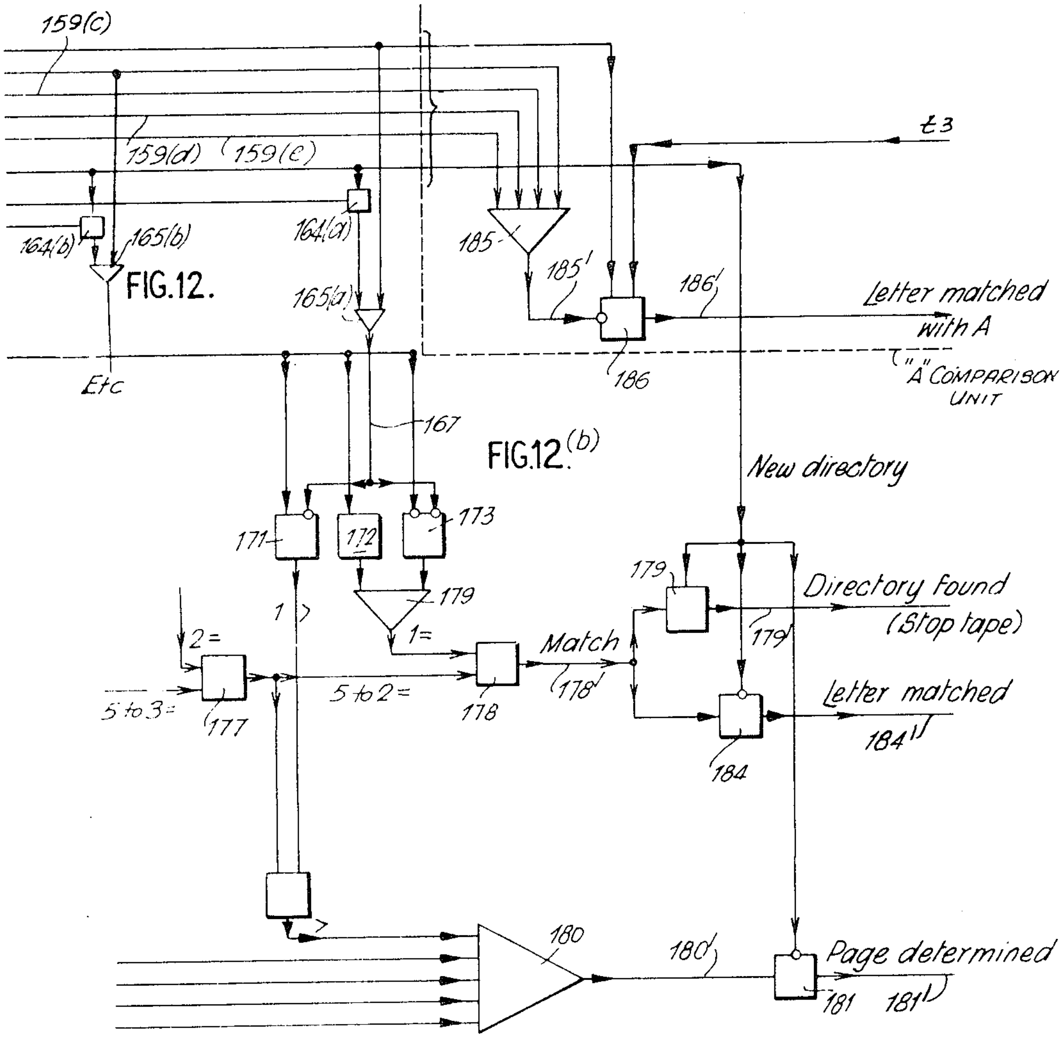
Figure 12A:
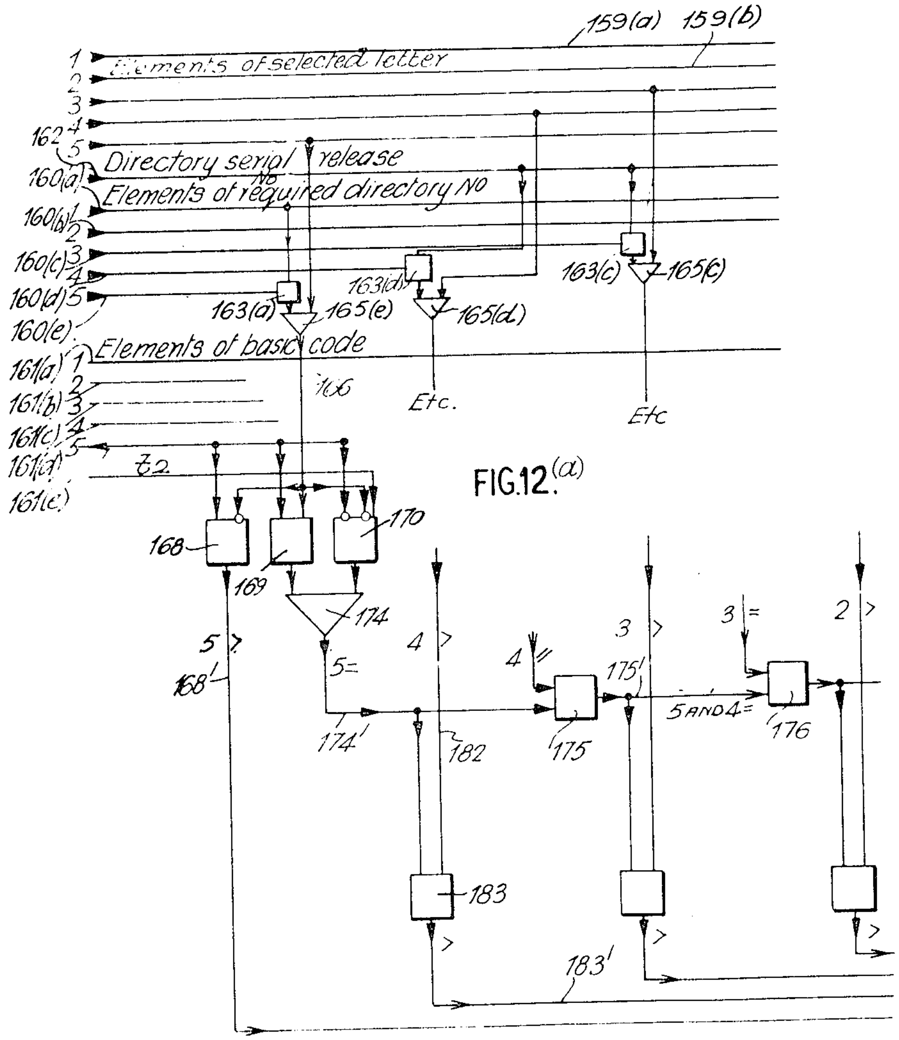
Figure 13:
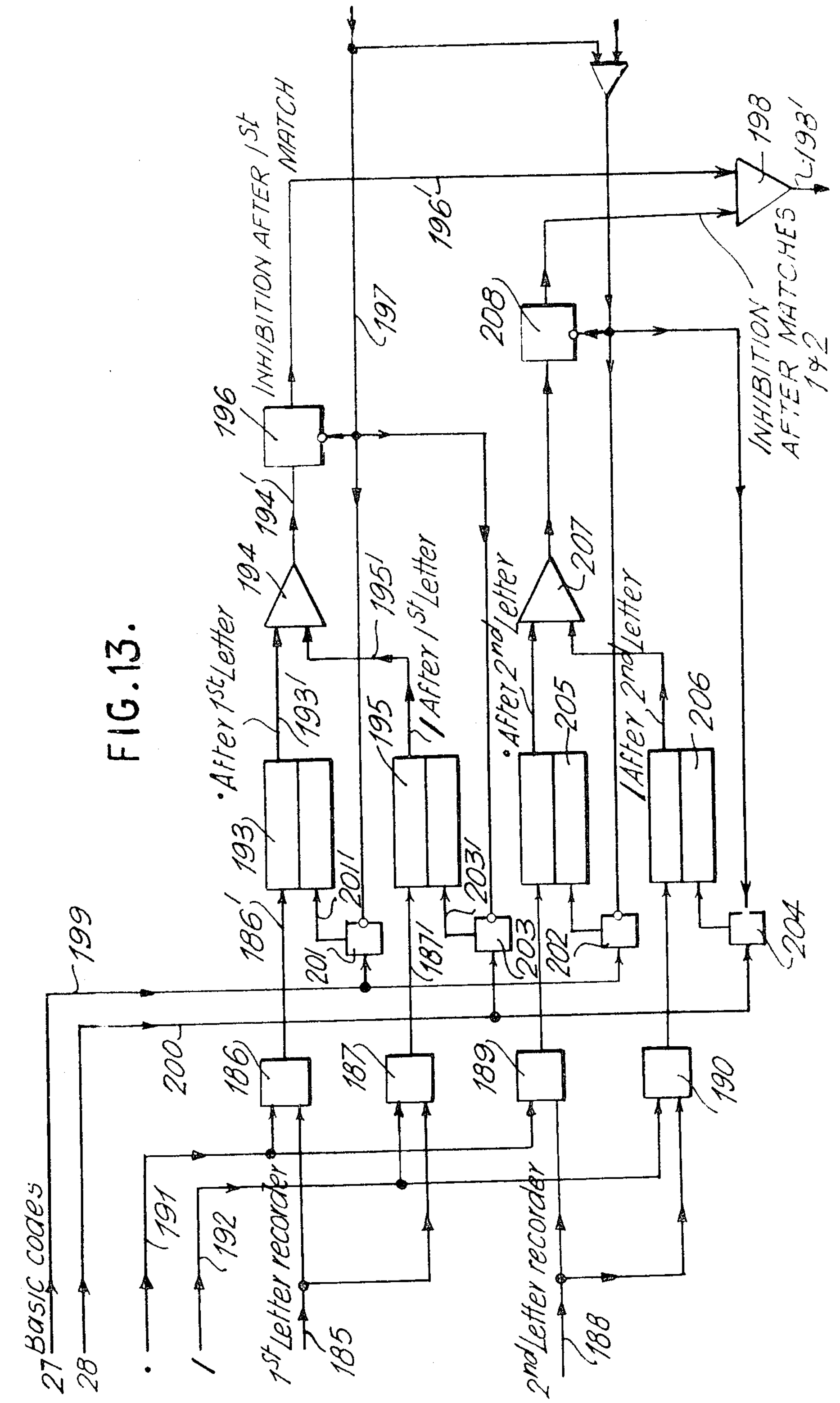
Figure 14:
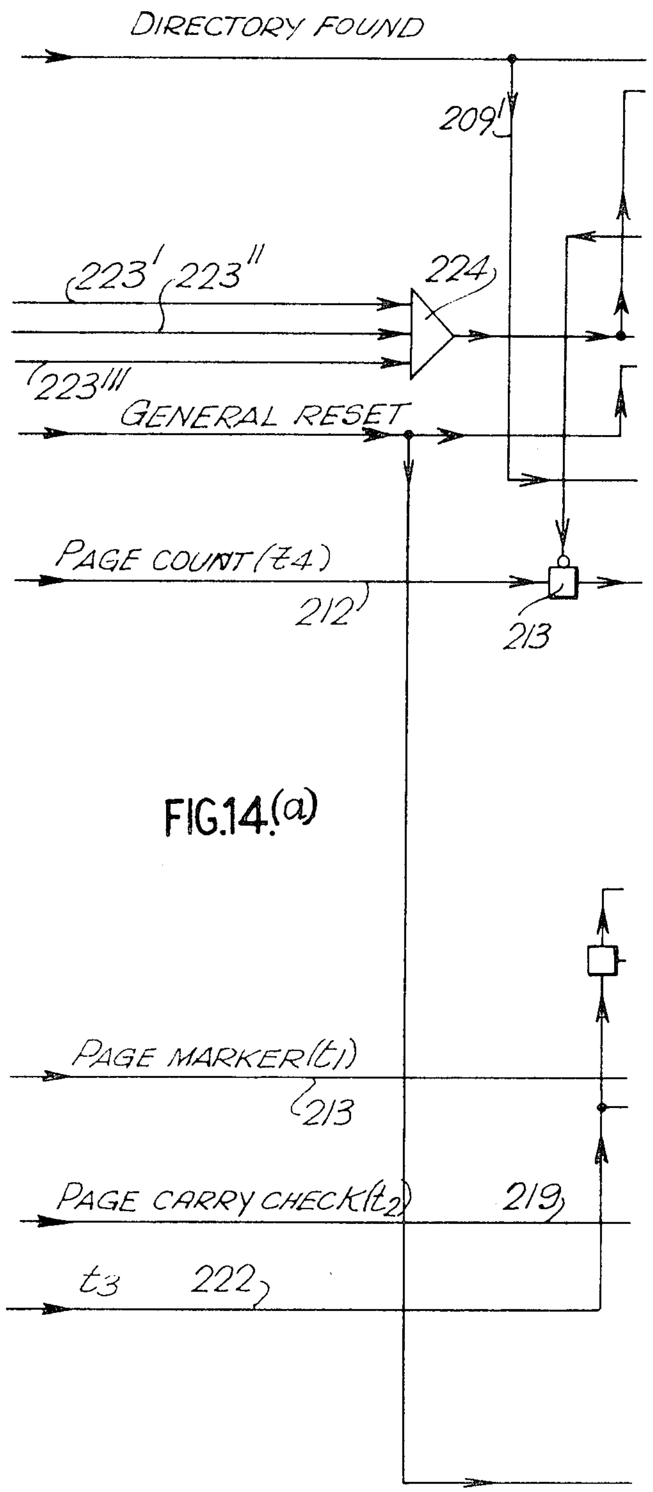
Figure 14:
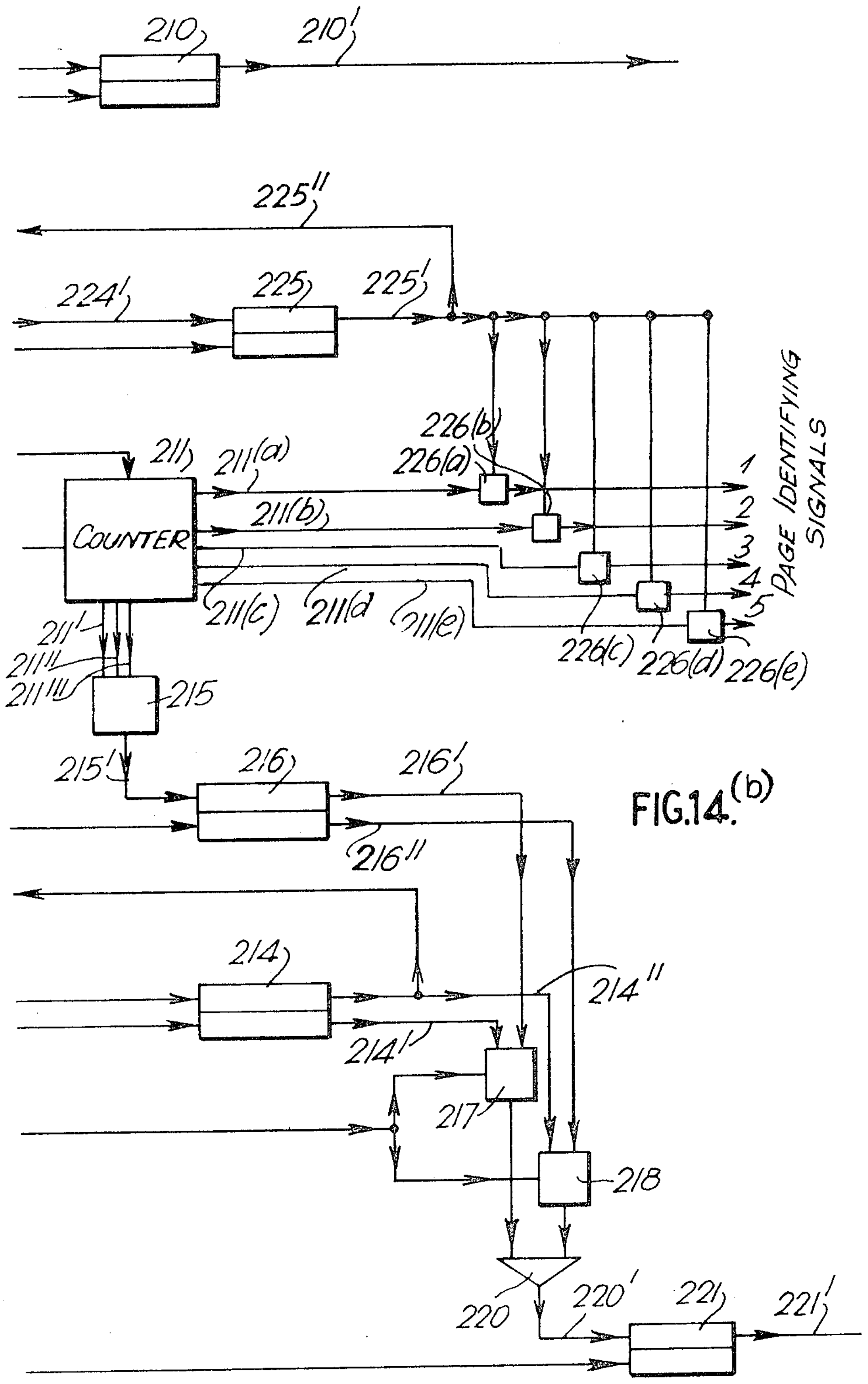

FIGS. 3 and 4(*a*) and 4(*b*) are diagrams showing part of the circuit of the "Page Selector" of FIG. 1, FIG. 5 is a block schematic diagram of a second embodiment of the invention, FIGS. 6*a* and 6*b* comprise a block schematic diagram of the "Comparison Unit" of FIG. 5, FIG. 7 is a circuit diagram of the "Control Code Interpretation Unit" of FIG. 6, FIG. 8 is a circuit diagram of the "Basic Code Interpretation Unit" of FIG. 6, FIG. 9 is a circuit diagram of the "Matching Control Unit" of FIG. 6, FIG. 10 is a circuit diagram of the "Position Comparison Unit" of FIG. 6, FIG. 11 is a circuit diagram of the "Letter Release Unit" of FIG. 6, FIGS. 12, 12(*a*) and 12(*b*) illustrate a circuit diagram of the "Character Comparison Unit" of FIG. 6, FIG. 13 is a circuit diagram of the "Punctuation Inhibition Unit" of FIG. 6, and FIGS. 14(*a*) and 14(*b*) illustrate a circuit diagram of the "Page Counter" of FIG. 6.

Referring to FIG. 1, a signal generating device 1 indicated by broken lines is provided to enable an operator to generate signals relating to specific data to be located in the data store. The signal generating device 1 can comprise a manually operable key-board 2, and a character interpretation unit 3. Facilities afforded by the key-board 2 enable the operator to initiate a series of electrical signals. A part of the series corresponds to the category for the specific name for which particulars are required (hereinafter termed "the category") and another part corresponding to name details which may include index letters of the name, for example the first three letters, punctuation used to qualify the significance of the index letters, and any other details that may be necessary to specify the specific name in sufficient detail for the specific data to be located in the data store. The series of electrical signals from the key-board 2 are supplied to a character interpretation unit 3 which routes those of the signals in the series corresponding to the category to a directory selector 4, and those of the signals in the series corresponding to the name details, i.e. index letters, punctuation etc., to a directory router 5.

The signals indicating the category in themselves can contain elements relating to an event and also features appertaining to that event. To illustrate this, information of a large business organization may be considered; for example, the event may be related to employees of the business and the features of the event may be related to the status of employees such as clerical personnel. In this case, the directory containing names of those employees in the business organization responsible for clerical duties would be selected.

The character interpretation unit 3 can be comprised of a counter having a gated input to which are successively supplied the signals contained in that part of the series of signals relating to the category information. At the time of receipt of the first signal, which may relate to the event, the counter is on a position that produces a voltage which is supplied to one input of a coincidence gate, for example an AND gate. The first signal is applied to the other input of the coincidence gate and passes through to the directory selector 4. The coincidence gate thereby creates a pulse that is applied to the input gate of the counter to step it to its next position. The same pulse also triggers a bistable which thereby produces a voltage, representative of the event, that passes through to the directory selector 4.

The second signal of the series, which may relate to a feature of the event, is then supplied to an input of a second coincidence gate the other input of which is primed by an output voltage from the second position of the counter so that a further pulse is created. Accordingly the said second pulse steps the counter and also triggers a further bistable which produces a continuing voltage representative of the feature of the event and is passed to the directory selector 4.

Once all the category signals have passed to the directory selector 4 the counter steps to a position that produces a voltage which is applied to the input gate of the counter and so inhibits further stepping. This voltage is also applied to prime another gate so that signals in the series relating to the name details may pass therethrough to the directory router 5.

The directory selector 4 is a gating matrix for detecting unique combinations of event and features signals inorder to produce output signals corresponding to the directory to which the unique combination (or combinations) relates. These output signals will hereinafter be referred to as "directory references" which are supplied to the directory router 5.

The director router 5 routes the name details signals from the character interpretation unit 3 to a page selecting means shown generally at 6 which consists of three page selectors,6*a*, 6*b* and 6*c* since, in the example shown in the figure, it has been assumed that the data locating device is to be used with a data store having three directories, and one page selector is provided for each directory. The directory router 5 can comprise a plurality of similar sets of AND gates there being one set for each of the page selectors 6*a*, 6*b* and 6*c*. Once a directory reference has been determined by the directory selector 4, this reference, constituted by a voltage, is applied to one input of each of the gates contained in the relevant set so that each gate in the said set is primed. The other input of each of the gates in the set is connected to a respective one of a plurality of signal lines along which the name details signals from the character interpretation unit 3 pass. The outputs of the gates contained in the set are connected to the page selector with which the set is associated and it will therefore be evident that, once the gates in the set have been primed, the name details signals from the character interpretation unit 3 are free to pass through the gates to the said page selector.

When the directory selector 4 has determined a page reference, it additionally produces an electrical signal for setting the first in the series of letter counters 7, 7*a* and 7*b*. Once set, which is almost instantaneously with receipt of the last signal defining a category, the letter counter 7 causes a visual and/or audible indication to be given that the system is ready to accept the first letter of the specific name to be located in the data store, and at the same time the letter counter 7 is connected to whichever page selector of the page selecting means 6 has been chosen and supplies a control signal 1.1 to the said selector. In the example illustrated by the figure, it is assumed that the page selector 6*a* has been chosen. The indication signifies to the operator that a key on the key-board 2 corresponding to the first letter of the specific name is to be depressed in order to initiate a first in the series of name details signals. This signal will be decoded by the character interpretation unit and subsequently routed via the directory router 5 to the page selector 6*a*.

The page selector 6*a*, to be described in greater detail later with reference to FIGS. 3 and 4 will automatically determine whether or not the first name detail signal in the series is sufficient to determine which page of the relevant directory contains the specific name. If all the names in the relevant directory beginning with the same first index letter appear on a single page of the directory and the first name detail signal corresponds to this index letter, then the page selector 6*a* will produce a signal identifying which page and at the same time the letter counter 7 will be reset. On the other hand, if names beginning with the said same first letter appear on two or more pages of the directory the directory selector 6*a* will produce a pulse to step the letter counter 7. In this event, the letter counter 7 causes an indication to be given signifying that further definition of the specific name is required. The operator must then depress a key on the key-board 2 which corresponds to the second index letter appearing in the required name to initiate a second in the series of name details signals. This is then routed via the directory router 5 to another section of the page selector 6*a* under control of a control signal 1.2 produced by the letter counter after it has been stepped. In this case, the name detail signal representing the first index letter is combined with that representing the second index letter and the combined signals are detected in a second section of the page selector 6*a* to determine whether all the names beginning with the same first two index letters appear on a single page of the directory. If this condition obtains the directory selector *6a* will produce a signal identifying which page and at the same time the letter counter will be reset. If not, the page selector *6a* will produce a pulse to step the letter counter 7 and consequently an indication will be given that a further key of the keyboard 2 corresponding to the third index letter of the name must be depressed to initiate a third in the series of name details signals. A control signal 1.3 from the letter counter 7 will then cause the original combination of the first and second index letter signals to be combined with the third. This latter combination is detected in another section of the page selector *6a* to determine whether or not all the names beginning with the same first three letters appear on a single page of the directory.

In large directories there will be some combinations of three index letters that begin names of which there are more than can be accommodated on one page. In this case a further section of the page selector is required to deal with these three letter combinations in conjunction with a fourth index letter. Similarly there may be a need for a section to deal with a fifth and also subsequent index letters. Moreover for common names it may be necessary to provide further definition for a keyword at a lower level, for example by initials or details of an address. This further definition at a lower level may be evident before the end of the first keyword, for instance the keyword THOMPSON after THOM.

In any case whenever, for a given combination of index letters for the first keyword, the structure of the data store is such that further definition is required the section of the page selector for the combination produces a signal that resets the letter counter 7 and sets a letter counter *7a* for the first index letter of the second keyword. A signal is produced by the letter counter *7a* to indicate that the first index letter is required for this word at the second level and a control signal 2.1 is produced to control a corresponding section of the page selector *6a* in which there is a coincidence gate to combine a combination of letters from the first word carried over from the relevant section with the first index letter of the second word that is entered from the keyboard 2. The process continues until the required page has been ascertained and in extreme cases the letter counter *7b* may be needed to control sections of the directory selector *6a* dealing with a third keyword of the specific name.

The identifying signals produced by the page selector 6a upon determining a page can be encoded by a coder 8.

Figure 2:
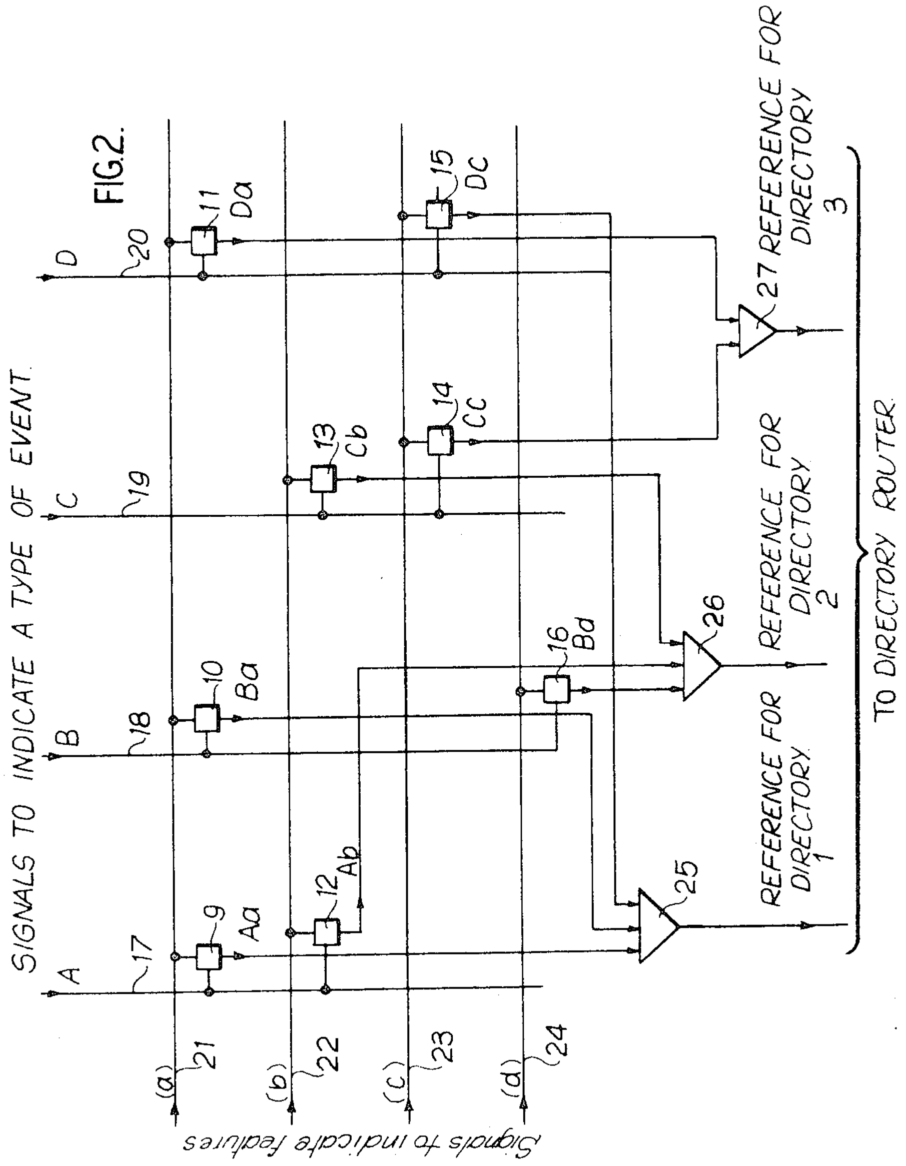
FIG. 2 is a circuit diagram of the "Directory Selector" of FIG. 1.

A greatly simplified schematic diagram of the directory selector 4 is shown in FIG. 2. The directory selector 4 is a gating matrix having a plurality of AND gates 9 to 16 respectively. In this example the matrix is designed to receive signals A, B, C and D each of which represents a different type of event, and also signals *a*, *b*, *c* and *d* representing different types of features but which may, however, be applied to one or more of the events that are represented. The signals A, B, C, and D originate from the character interpretation unit 3 and are carried on lines 17, 18, 19, and 20 respectively. The signals *a*, *b*, *c* and *d*, which also originate from the character interpretation unit 3, are carried respectively on lines 21, 22, 23 and 24. The input connections of the AND gates 9 to 16 will be readily apparent. As previously described, the category information is usually constituted by a unique combination of an event signal and a feature signal and it is to be noted here that that one, two or even three unique combinations may be indicative of information contained in but one of the directories. For example, in the simple case shown in the figure the combination of the event signal A and the feature signal *a* is indicative of the information contained in the directory 1 as are the combination B*a* and D*c*. Similarly, the combinations B*d*, A*b* and C*b* are each indicative of the information contained in the directory 2. However, only two combinations namely C*c* and D*a* are indicative of the information contained in the directory 3. The outputs from the gates 9, 10 and 15 pass to the directory router 5 (FIG. 1) via a gate 25, those from the gates 12, 13 and 16 via a gate 26, and those from the gates 14 and 15 via a gate 27.

Description will now be given, by way of example only, of the circuit configuration of a page selector with reference to FIGS. 3 and 4 showing respectively first and second sections only of the selector. Such sections might be included in any one of the page selectors *6a*, *6b* and *6c* shown in FIG. 1.

Referring to FIGS. 3 and 4, the page selector comprises a code indexing matrix consisting of a plurality of gating circuits. The design and configuration of these circuits bears an exact correspondence with the structure and organization of the directory with which it is associated. In presenting these figures, it is assumed that names contained within the relevant directory beginning with the index letters A to P inclusive appear on more than one page in the directory; those beginning with the index letters Q to W inclusive appear respectively on a single page of the directory, and those beginning with the index letters X, Y and Z all appear on a common single page of the directory.

Upon selection of the relevant directory, the letter counter 7 (FIG. 1) causes an indication to be given signifying that the system is ready to accept the first letter of the first word in the specific name. At the same time, the letter counter 7 provides a control signal 1.1 bringing the first section of the page selector on a line 28 (FIG. 4) and is constituted by a voltage which primes a plurality of AND gates 29, 30, 31 . . . 45 . . . 51, 52 and 53.

Reverting to the example given previously in which particulars of an employee are required, it is now assumed that the employee's name is YANDELL. Accordingly, the operator depresses the key on the keyboard 2 representing the index letter Y. Thereafter, a signal voltage is applied to a line 54 by way of the directory router 5 and since the gate 52 is primed, a signal is produced at its output which passes through a gate 55 and appears as an identifying signal at the output of the page selector on a line 56 which is applied to a bistable to produce a continuing voltage. Additionally the output signal from the gate 55 is carried by a line 57 to a gate 58 through which it passes to indicate that a page has been determined because all the names beginning with the index letter Y are to be found on a single page in the directory. The signal indicating that the page has been found resets the letter counter 7.

An example is now considered in which it is desired to find particulars of an employee named BARLOW. In this case upon indication that the first letter of the name is required, the key representing the index letter B is depressed. Therefore a signal voltage is applied to a line 59 via the directory router 5, and since the gate 30 connected with this line is primed a signal is produced at its output and is carried on a line 60. Because names beginning with the index letter B appear on more than one page of the relevant directory, the circuitry of the page selector is so designed that the signal voltage on the line 60 passes to a gate 61 to produce a signal, which steps the letter counter 7 thereby providing an indication that a further letter is required and also another control signal 1.2 bringing the second section of the page selector (FIG. 4) to a state of readiness. In addition, the signal on the line 60 indicative of the letter B is applied to a bistable to produce a continuing voltage carried on a line 62 to the second section of the page selector (FIG. 4) where it primes a gate 63 so that it may be combined with the signal indicative of the second index letter of the name when this has been initiated. When this occurs a signal voltage appears at the output of the gate 63 on a line 64. In this case, the relevant directory contains more than two pages containing names beginning with index letters BA so that the signal voltage on the line 64 passes through a gate 65 to produce a signal which steps the letter counter 7, and the cycle is repeated in respect of the third letter of the name, namely R. Additionally, the combination of the signals indicative of the letters BA are applied to a bistable to produce a continuing voltage supplied on a line 66 to a third section of the page selector (not shown). The cycle progresses until the page has been determined.

There are cases of common names of which the number is so large that they appear on several pages in a directory. For example the name SMITH spans many pages of a telephone directory. The page selector associated with such a directory can have built in a provision whereby the name SMITH, may be designated by the combination of a signal representing the index letter S and a signal representing a punctuation symbol for example "/". In the cycle previously outlined this would have the effect of a signal voltage indicative of the letter S being supplied from the first section of the page selector to the second section on a line 67 (FIG. 4). An AND gate 68 is thereby primed and upon receipt of a signal voltage indicative of the symbol "/" along a line 69 the gate 68 would produce an output signal indicating that the first index letter of the second keyword in the name is required by causing the letter counter 7 to be reset and stepping the letter counter 7*a*. Additionally, the combination of the signals indicative of the letters "S/" are applied to a bistable that produces a continuing voltage supplied on a line 70 to another section of the page selector. Similar use may be made of the symbol ".", especially when initials are considered.

From the foregoing description the significance of the various gates and lines which have not been referenced will be apparent and unecessary repetative description of these aspects will not, therefore be made.

However far sighted the initial planning of the organization of names in the directory, there must, almost inevitably, come a time when reorganization of the directories and hence their page selectors is necessary to accommodate cumulative additions over a period and a change might also be required in the spread of names with different combinations of starting index letters.

Such changes would involve either modification of existing circuitry in the page selectors or the entire replacement of existing circuits for newly designed circuits. Ideally, the page selector circuits are constructed using modular plug-in circuit boards and new boards can be designed and made as necessary and can be inserted in place of the old when the changes are made. The changes are facilitated by the use of plug-in boards, but even so the work involved is tedious and time consuming. This problem is largely overcome in a second preferred embodiment of the invention now to be described.

FIG. 5 shows a second embodiment of the present invention comprising a signal generating device 71 consisting of a keyboard 72, and a character interpretation unit 73. Connected with the character interpretation unit 73, is a directory selector 74. These units can be similar to those contained in the first described embodiment and accordingly, no further description thereof will be given.

One output of the director selector 74 is connector by a lead 74′ to a comparison unit 75 and a second output is connected with a page index reader 76 via a line 74″.

The page index reader 76 can comprise a transcription device including a magnetic recording medium, for example a magnetic tape, on which is recorded coded information corresponding to the directories in the data store with which the device is to be used together with a series of page codes that indicate the index letters of names or keywords on successive pages of each directory. The codes will, of course, directly correspond to the structure and organization of the store of data.

When category information relating to an event and features of the event has been initiated by the keyboard 72, the character interpretation unit 73 is operable to supply a series of signals corresponding to the category information to the directory selector 74 the circuitry of which detects the combination of these signals and produces a coded output corresponding to the directory containing the required category information. This output is carried to the comparison unit 75 on the line 74′. Simultaneously, the second output from the directory selector 74 appearing on the line 74″, starts the magnetic tape which sequentially releases index codes including those of the directory serial numbers to the comparison unit 75 via a line 76′ until a match is made by the comparison unit 75 between the coded signals from the directory selector 74 and those from the page index reader 76. Once the two codes have been matched the comparison unit 75 produces an output signal on a line 75′ causing the tape to be stopped at that section thereof which is the commencement of the required directory.

Name details signals, for example, the first three index letters of the specific name initiated by the keyboard 72, are entered from the character interpretation unit 73 into the comparison unit 75 where they are held and once the relevant directory has been determined the tape is restarted by a signal on a line 75″.

The page index codes from the tape are then successively released by the page index reader 76 along the line 76′ to the comparison unit 75. Initially all the page index codes relating to the first index letters (which have a control code of "01") are compared in turn with the coded signals of the first index letter from the keyboard 72 until an exact match has been made between the said two codes.

The same comparison is then made between successive page index codes relating to second index letters; these codes bear a control code of "10". The process continues automatically through successive levels until a match has been made and the page has been determined. At this point the comparison unit 75 produces signals identifying the required page on a line 75'''.

In some cases it may not be possible to make a match for index letters occurring after the first index letter position because the subsequent page index codes from the page index reader 76 do not compliment the coded signals from the keyboard 72 corresponding to index letters at the second or the third index letter positions. This situation would arise for a specific name appearing on a page containing names having an index letter at, for example, the third index letter position, which is earlier in the alphabet than the index letter of the specific name at the same position, and also containing names having an index letter at the same position which is later in the alphabet than the index letter of the specific name at the same position. For example, the name ROGERS might appear on a page beginning with the name ROBERTS and ending with the name ROPE so that a match at the third index letter position, namely for the letter G, could never be obtained because the relevant page index codes at the third position will correspond to the letter B and the letter P respectively.

There is another situation in which a complete match at a particular index letter position will not be possible. After a letter has been matched at a certain index letter position the subsequent page index code may relate to the same or a higher index letter position because all the other names with index letters at the former index letter position are accommodated on the previous page. For example, a page beginning with a name having first and second index letters MO may contain all names in the directory that begin with the index letters MO so that the next page may begin with, for example, a name beginning with the index letters MU. Thus it would be impossible to obtain a match for the third index letter of any name on the former page.

Nevertheless, in all these cases when matching is not possible the page containing the specific name has in fact been determined, since the specific name must be on the page immediately preceding that which indicates that a match cannot be made.

Thus in the first case quoted above when the page index code at the third index letter position was seen to be greater than the index letter G the specific name must appear on the page commencing with a name having a third index letter B.

In the second case, after matching the index letter O at the second index letter position and the next page index code was also at the second level the specific name must appear on the page containing names having a second index letter O.

The code groups are recorded, for example, in rows across the tape and in describing this particular embodiment it is assumed that each code is a seven-bit binary code which consists of two parts, namely a control code and a basic code. The control code is a two-bit word indicating numerical values of one, two or three. The numerical values 1, 2 or 3 of the control code indicate respectively whether the letter indicated by the basic code is the first, second or third. In the case of the numeral value zero this indicates that the code has a special significance. The basic code is a five-bit word in which the numerical values 1–26 correspond to the letters of the alphabet and the numerical values 27–31 are used as special indicators.

An example of the coding for one directory is shown in the table below.

| Code | Binary Representation | Comments |
|---|---|---|
| 0,31 | 00 11111 | Directory start |
| 0,7 | 00 00111 | Directory number 7 Blank tape |
| 1,1 | 01 00001 | Page 1 following has names starting at A. |
| 2,13 | 10 01101 | Page 2 following has names starting at AM. |
| 3,5 | 11 00101 | Page 3 following has names starting at AME. |
| 2.16 | 10 10000 | Page 4 following has names starting at AP. |
| 1,27 | 01 11011 | Page 5 following has initials starting at A |
| 2,16 | 10 10000 | Page 6 following has initials names starting at AP |
| 1,2 | 01 00010 | Page 7 following has names starting at B. |
| 3,18 | 11 **10010** | Page 8 following has names starting at BAR. |
| 3,31 | 11 11111 | Page check code after every 8 pages. |
| 2,5 | 10 00101 | Page 9 following has names starting at BE. |
| 1,28 | 01 11100 | Page 10 following has names in group B. |

The start of each directory is indicated by the binary representation 00 11111 and this is followed immediately by a binary representation indicating the serial number of the directory which in the table above is number 7. Once a match has been made in selecting the required directory the tape stops on a blank section which always follows these two code groups.

The names for each directory are held in alphabetical order. When the control code has a value of 1, the basic code value (1–26) refers to the first index letter of the specific name. Such a code, for the purpose of explanation, is represented as 1,(*i*), where (*i*) is given here as a symbol indicating the appropriate numerical value of the first index letter which shall be denoted by the symbol I. The arrangement is such that this code indicates that the following page contains the first page of names beginning with the first index letter I. Following a code indicating that the next page contains names beginning with I, a code on the tape with a control code value of 2, and basic code (*ii*), indicates the second index letter II of the names; in effect this means that the following page contains the first (or only) page of names beginning with I II, since I represents the first index letter that has already been defined.

After codes indicating that the names following begin with I, II, there follows a page code with a control code value of 3, and in this case the basic code value (1–26) refers to the third index letter of the name. Such a code is represented as 3(*iii*) where (*iii*) is the appropriate value of the third index letter. This code indicates that the following page starts with names beginning with the letters I II III, since I and II represent the first and second index letters that have already been defined.

If a code on the tape, directly following a code with a control code value of 1 has a control code value of 3, it is inferred that the second index letter is A. Any other second index letter is defined before defining a third index letter.

FIG. 6 is a block schematic diagram of the comparison unit 75 shown in FIG. 5. The sequence of operation of the comparison unit 75 is controlled by timing pulses $t_1$ $t_2$ . . . $t_5$ derived from a timing control 77 actuated upon receipt of clock pulses derived from a clock track on the magnetic tape. A clock pulse is provided in respect of each code group recorded on the tape. The timing control 77 can comprise, for example, a fixed frequency continuous pulse generator, the output from which is supplied to a counter under control of a gate opened each time a clock pulse is received from the tape. The counter is stepped sequentially by the pulses it receives from the generator and creates at its output the timing pulses $t_1$, $t_2$ . . . $t_5$ which are applied to respective lines.

Control code elements from the magnetic tape are supplied to a control code interpretation unit 78, the operation of which is governed by the timing pulses $t_1$ and $t_5$. Basic code elements from the magnetic tape are supplied to a basic code interpretation unit 79 the operation of which is governed by timing pulses $t_1$ $t_2$, $t_3$, and $t_4$.

When the control code interpretation unit 78 detects the control code "00" signifying a new directory it creates a voltage on a line 78' which causes the basic code interpretation unit 79 to release basic code elements corresponding to the serial number of the new directory to a character comparison unit 80. Here comparison is made between the said basic code elements and coded signals representing the serial number of the revelant directory originating from the directory selector 74 (FIG. 5). When a match is made between these two code signals the character comparison unit 80 produces an output signal on a line 80' which causes the tape to be stopped and bistable in a page counter 81 to be set, indicative that the directory has been found. Once set, the bistable in the page counter 81 produces an output voltage on a line 81' which is applied to the control code interpretation unit 78 and the basic code interpretation unit 79. These two units 78 and 79 are thereby placed in a state of readiness to receive respectively control code elements and basic code elements in respect of the page index code groups on that section of the tape which has been selected.

The encoded name details signals 1,2,3 from the character interpretation unit 73 (FIG. 5) representing the first three index letters of the first word of the specific name are supplied respectively along lines 73', 73'' and 73''' to be entered into a letter release unit 82 where they are held. Immediately after these signals have been entered the letter release unit 82 produces an output control signal on a line 82' to restart the magnetic tape of the page index reader 76(FIG. 5).

The first group of control and basic code elements appearing on the magnetic tape along its line of travel are supplied respectively on lines 76' and 76'' to the control code interpretation unit 78 and the basic code interpretation unit 79.

When the control code interpretation unit 78 receives the control code elements namely "01" of the first code group signifying the first index letter position, it produces a continuing voltage signal carried by a line 78'' to a position comparison unit 83 the sequence of operation of which is controlled by the timing pulses $t_2$ and $t_3$. The voltage signal on the line 78'' indicates that a first index letter position has been detected. At the same time a matching control unit 84 produces a continuing voltage signal on a line 84' which indicates that a match is required at the first index letter position. This signal is carried by the line 84' to the position comparison unit 83.

When these two voltage signals are present the position comparison unit 83, at the instant it receives the timing pulse $t_2$, supplies a pulse on a line 83' which controls the letter release unit 82 to release the coded signals representing the first index letter along a line 82'' to the character comparison unit 80. At the same time the basic code elements of the first code group are released from the basic code interpretation unit 79 to the character comparison unit 80 along a line 79(*a*).

The character comparison unit 80 compares the respective basic code elements with the coded signals.

If the binary value of the basic code is less than that of the coded signals no action is taken but if the two codes are identical the character comparison unit 80 produces an output pulse indicating that the first index letter has been matched at the first index letter position. This signal, indicating a letter match, is carried to the matching control unit 84 on a line 80''.

This voltage signal immediately steps a counter in the matching control unit 84 at the end of the timing pulse $t_2$ to cause this unit to produce a continuing voltage showing that a match is required for the second index letter position. This voltage signal is supplied along a line 84'' to the position comparison unit 83.

The voltage signal on the line 78'' in conjunction with that supplied on the line 84'' indicates that a match for the first index letter position has been determined and at the instant the timing pulse $t_3$ is applied to the position comparison unit 83 this unit supplies a pulse along a line 83'' to release the coded signals representing the second index letter along a line 82''' to an A comparison unit 85.

In the A comparison unit 85 the timing pulse $t_3$ applied thereto is used to test whether or not the coded signals supplied along the line 82''' correspond to the letter A. If they should happen to do so (because A is the letter in the second index letter position of the specific name) then the A comparison unit 85 will produce a pulse which is supplied along a line 85' to the matching control unit 84. Upon receipt of this signal the counter in the matching control unit 84 steps on to produce a continuing voltage signal which is supplied along a line 84''' to the position comparison unit 83 to indicate that a match is now required for the third index letter position.

If, on the other hand, the index letter in the second index letter position is not A the A comparison unit 85 remains inoperative.

In the event that the control code interpretation unit 78 receives control code elements, namely "10" signifying a second index letter, it will produce a continuing voltage signal along a line 78''' which is supplied to the position comparison unit 83. This voltage, in conjunction with the voltage from the matching control unit 84 along the line 84'' indicating that a match is required for the second index letter position, is used to release a $t_2$ timing pulse along a line 83'' to the letter release unit 82. In turn, this signal releases the coded signals representing the index letter in the second index letter position along the line 82'' to the character comparison unit 80 where it is compared with the basic code elements released from the basic code interpretation unit 79 and carried to the character comparison unit 80 along the line 79(*a*).

If the binary value of the basic code is less than that of the coded signal representing the second index letter no action results.

If the binary value of the basic code is greater than that of the coded signals because the former page contains the specific name then a signal produced by the character comparison unit 80 is sent along a line 80''' to the page counter 81 to show that the page containing the specific name has been determined.

If the binary value of the said two codes is equal then the index letter has been matched and a pulse indicating this is supplied by the character comparison unit 80 at the occurrence of the timing pulse $t_2$ along the line 80'' to the matching control unit 84.

At the end of the timing pulse $t_2$ the counter in the matching control unit 84 steps to provide a continuing voltage signal supplied along the line 84''' to the position comparison unit 83 indicating that a match is now required for the third index letter position. This signal, in conjunction with that already being supplied to the position comparison unit 83 along the line 78''' from the control code interpretation unit 78, causes the position comparison unit 83 to produce a pulse supplied along a line 83''' to the letter release unit 82. Upon receipt of this pulse the letter release unit 82 releases the coded signals for the index letter in the third index letter position along the line 82''' to the A comparison unit where the timing pulse $t_3$ is used to test whether or not the coded signal corresponds to the letter A.

If the coded signals do correspond to the letter A then at the end of the timing pulse $t_3$ the counter in the matching control unit 84 steps to produce a continuing voltage signal along a line 84'''' to show that a complete match has been obtained.

If, on the other hand, the A comparison unit 85 does not detect a letter A in the third index letter position then the matching control unit 84 continues to supply the voltage signal along the line 84''' and this will be used in conjunction with a continuing voltage on a line 78'''' occurring when the control code interpretation unit 78 detects a control code "11" signifying a third index letter, to initiate a sequence of signals enabling the character comparison unit 80 to compare the basic code elements for the third index letter position with the coded signals representing the third index letter released from the letter release unit 82.

Again, the page may be determined because the binary value of the basic code is greater than that of the coded signals, or there may be a match because the binary values are equal. In the former case a signal is sent along the line 80''' to the page counter 86. In the latter case a signal is sent along the line 80'' to the matching control unit 84 which then sends out a continuing voltage signal along the line 84'''' to show that there is a complete match for the first three index letter positions.

The voltage on the line 84'''' is now used in conjunction with a voltage, if any, appearing on the line 78'''', from the control code interpretation unit 78 indicating a further control code with control code elements "11", to release, for a second time the coded signals for the third index letter position. Thus, these signals are compared for a second time in the character comparison unit 80 with the basic code elements for the succeeding page code.

At this stage a match will be made only if two or more successive pages are accorded the same basic code as will occur when a given three letter combination has continuation pages. In this event a pulse is sent by the character comparison unit 80 along the line 80'' to the matching control unit 84 where it is used in conjunction with the continuing voltage indicating a complete match to produce a voltage signal along a line 84''''' to indicate the presence of continuation pages.

If, at any time, the position comparison unit 83 receives a voltage corresponding to an index letter position higher than the position required to be matched (as indicated along the lines 84'' and 78''') as would occur when the control code elements received by the control code interpretation unit 78 indicate that all names with index letters in the lower positions have been included on the previous page, then a pulse is sent at the occurrence of the timing pulse $t_2$ along a line 84''''' to the page counter 81 to show that a page has been determined.

When names include punctuation symbols, a punctuation inhibition unit 86 is provided first to register the symbols including the position in the name at which they occur, and second to inhibit the release of basic codes representing letters for any position from the basic code interpretation unit 79 to the character comparison unit 80 until after a basic code has been reached on the tape in respect of pages containing these punctuated names. For example, if the specific name is A.B.C., then having matched the index letter A, the index letter B must not be released until after a page in the directory has been reached that contains names with a full stop "." in the second index letter position.

In the table of codes given for this embodiment the punctuation symbols "." and "/" are used and are signified by the numerals 27 and 28, since these follow after the numeral 26 which indicates the letter Z in the alphabet.

Name details signals in respect of these punctuation symbols are initiated by the keyboard 72 and supplied by the character interpretation unit 73 along lines 73'''' and 73''''' to the punctuation inhibition unit 86.

Because such symbols may occur at more than one index letter position of the name, voltage signals are sent from the letter release unit 82 along lines 82'''' and 82''''' indicating respectively when the first and second index letters have been recorded. This enables the punctuation inhibition unit 86 to register the punctuation symbols according to the particular index letter positions in the name at which they were initiated.

If a punctuation symbol occurs in the name after the last index letter position, then no inhibition is required until after a match has been obtained for the first letter. Accordingly, a signal from the matching control unit 84 along the line 84' is supplied to the punctuation inhibition unit 86. After this voltage disappears when the first match has taken place, a continuing voltage signal is supplied from the punctuation inhibition unit 86 to the basic code interpretation unit 79 along a line 86' thereby to inhibit the relrease of basic code elements to the character comparison unit 80.

As soon as the basic code 27 or 28 in respect of a punctuation symbol is detected by the basic code interpretation unit 79, a pulse signifying this is passed along a line 79($b$) or 79($c$) as the case may be to the punctuation inhibition unit 86 at the occurrence of the timing pulse $t_2$ to remove the inhibition in respect of punctuation occurring after the first index letter.

However, inhibitions in respect of punctuation symbols appearing in later index letter positions of the name must remain until a further match has been obtained in respect to the second and possible subsequent index letter positions. To this end, a continuing voltage supplied by the matching control unit 84 is supplied along the line 84'' to the punctuation inhibition unit 86 to indicate when a second match has been made. The detection of basic codes 27 or 28 by the basic code interpretation unit 79 after the second or subsequent match serves to remove the inhibition in respect of the punctuation symbols occurring at later index letter positions.

At the occurrence of the timing pulse $t_4$ the basic code interpretation unit 79 supplies a pulse along a line 79($d$) to the page counter 81 in respect of every basic code relating to a page in the directory. These pulses are counted by the page counter 81 until a page has been determined.

Indication that a page has been determined may be given either by a signal voltage from the character comparison unit 80 along the line 80''' or by a signal voltage from the position comparison unit 83 along the line 83'''' or thirdly by a signal voltage from the matching control unit 84 along the line 84'''''.

The signal voltages on the lines 80''' and 83'''' are produced at the occurrence of the timing pulse $t_2$ and are applied to inhibit the input to the counter in the page counter 81 before it receives the page count pulse along the line 79($d$).

In the third case the voltage produced by the matching control unit 84 indicating that a complete match has been made (i.e. that on the line 84'''') is also used in conjunction with the timing pulse $t_5$ to set a bistable in the matching control unit 84 to produce the continuing voltage signal on the line 84''''' which is used to inhibit further counting by the page counter 81 after the counter has received the pulse along the line 79($d$) in respect of the current page.

It will be apparent that the counter is stopped at the count for the current page in this third case, but for the other two cases the count is stopped in respect of the page number for the previous page.

When the count is stopped the page counter 81 produces output signals along lines 81($a$) which identify the page number of the determined page. These signals are supplied to any device that is required to take action on these signals.

Because of the possibility that the counter in the page counter 81 may get out of step through some deficiency in operation, provision is made to enable a check to be made on the counter by including on the magnetic tape a special page marker code after page index codes for every, for example, eight pages. This number of pages need not necessarily be eight but it should be a number constituting a basic binary condition, for example, 16, 32, etc.

In the illustration of coding given for this embodiment the page marker code is shown as "11 11111", that is to say, this code has a control code of "11" and a basic code "11111", this latter being equivalent to the decimal value 31.

The basic code elements, namely "11111", are detected by the basic code interpretation unit 79 to produce a page marker signal voltage fed to the page counter 81 along a line 79($e$). This signal voltage is produced at the occurrence of a timing pulse $t_1$ and is used to set a bistable in the page counter 81.

The page counter 81 contains means for producing "carry" signals for each of the first three positions of the counter. The carry signals are fed to a coincidence gate in the page counter 81 in succession in order to set another bistable at the instant of time when there is a carry on all the said three positions. These occur at the occurrence of the timing pulse $t_4$ corresponding to the page count pulse supplied from the basic code interpretation unit 79 along the line 79($e$).

Two coincidence gates are provided in the page counter 81 which are provided with inputs respectively for the ON position of the said carry bistable and the OFF position of the said marker bistable, and vice versa. A timing pulse $t_2$ is supplied to both these gates via the basic code interpretation unit 79 along a line 79($f$) to set another bistable in the page counter 81 whenever there are two other inputs on either of these gates. This bistable creates an alarm to show that the counter is out of step with the page markers.

The carry and marker bistables are set at the occurrence of every timing pulse $t_3$ to enable them to perform the check for every page that is counted.

FIG. 7 shows a circuit diagram of the control code interpretation unit 78 (FIG. 6). The circuit includes four coincidence gates 87, 88, 89 and 90, and three bistables 91, 92 and 93.

Control code elements appearing at the sixth and seventh bit positions of the page index codes from the magnetic tape are supplied to the circuit along lines 94 and 95, respectively.

When the circuit receives the control code elements "00" indicating a new directory, these are applied to respective inputs of the coincidence gate 87. In conjunction with a timing pulse $t_5$ applied to another input of the gate 87 along a line 96, the gate 87 produces an output pulse indicating that a new directory has been detected. This pulse is supplied along a line 87' to the basic code interpretation unit 79 (FIG. 6).

The action taken by the basic code interpretation unit 79 upon receipt of this signal will become apparent from the detailed description to be given of this unit, with reference to FIG. 8.

As previously described, when the relevant directory has been found, the page counter 81 (FIG. 6) produces a continuing voltage signal along the line 81' indicating this condition. This voltage signal is applied to the circuit of the control code interpretation unit along a line 97 and primes each of the gates 88, 89 and 90.

The circuit is now in a state of readiness to receive control code elements from the magnetic tape representing any of the three index letter positions of the page index codes. These control code elements, namely "01", "10" and "11" represent, respectively, the first and second and third index letter positions.

When the control code elements "01" appear on the lines 94 and 95 respectively, the gate 88 will, in conjunction with a timing pulse $t_1$, produce an output pulse which is supplied along a line 88' to trigger a bistable 91 which thereupon produces a continuing voltage signal along a line 91'.

When the control code elements "10" appear on the lines 94 and 95 respectively, the gate 89 produces an output pulse at the occurrence of a timing pulse $t_1$ which is applied along a line 89' to an input of the bistable 92 which is thereby triggered to produce a continuing voltage signal on a line 92'.

In a similar manner the gate 90 is operable to produce an output pulse along a line 90' when the control code elements "11" appear on the lines 94, 95. This pulse triggers the bistable 93 thereby to produce a continuing voltage signal on a line 93'.

The continuing voltage signals appearing on the lines 91', 92' and 93' indicate, respectively, that a position has been detected at the first, second, and third index letter positions as the case may be. These voltage signals are supplied to the position comparison unit 83 (FIG. 6) and their action in this unit will become apparent at a later stage when detailed description of the position comparison unit is given with reference to FIG. 10.

The circuit of the basic code interpretation unit 79 (FIG. 6) is shown in FIG. 8. Referring to FIG. 8, the basic code elements from the magnetic tape are applied, successively, in parallel along lines 98(*a*), (*b*), (*c*), (*d*) and (*e*), one of these lines being provided in respect of each of the fine bit positions of the basic codes.

Detection of the basic code elements is made by a gating circuit configuration consisting of coincidence gates 99, 100, 101, 102, 103 and an OR gate 104.

It will be apparent that this circuit is provided for detecting basic codes having numerical values 31, 27 and 28. The former is an indication of the start of a new directory and the two latter basic codes are indicative of the punctuation symbols "." and "/".

As previously described when the control code interpretation unit 78 detects the control code "00" indicating a new directory it supplies a pulse, at the occurrence of a timing pulse $t_5$, along the line 78' indicating this condition. This pulse is applied along a line 105' to a coincidence gate 105. Basic code elements "11111" following this control code and appearing on the lines 98(*a*) – (*e*) are detected by the combination of the gates 99, 100 and 101 to produce an output pulse fed to the gate 105 by a line 101'. In conjunction with this pulse and that on the line 105' the gate 105 produces an output pulse along a line 105'' which triggers a bistable 106 which thereupon supplies a continuous voltage along a line 106'.

The gate 101 also supplies an output pulse on a line 101' to one of three inputs of an OR gate 107, which passes therethrough and is applied to each of five coincidence gates 108(*a*) – (*e*) connected respectively with the lines 98(*a*) – (*e*). The aforesaid pulse from the gate 107 on the line 107' places an inhibition on each of the gates 108(*a*) – (*e*) so that the basic code elements "11111" do not pass.

The continuing voltage signal on the line 106' produced by the bistable 106 is applied to an input of a coincidence gate 109 which produces an output pulse on a line 109' at the occurrence of a timing pulse $t_2$. The pulse on the line 109' controls the circuitry of the character comparison unit 80 to permit the entry, into this unit, of the coded signals representing the relevant directory serial number from the directory selector 74(FIG. 5).

The next page index code is constituted by control code elements "00" and basic code elements indicating the serial number of the directory. In the example given the basic code is "00111" indicating directory serial number 7. These basic code elements are applied in parallel to the lines 98(*a*) – (*e*) and since the inhibition has been lifted from the gates 108(*a*) – (*e*), these basic code elements will be released from the basic code interpretation unit to be entered into the character comparison unit 80 (FIG. 6) along lines 110(*a*) – 110(*e*).

At this point a coincidence gate 111 produces a pulse on a line 111' which resets the bistable 106. The gate 111 operates to produce the pulse on the line 111' at the occurrence of a timing pulse $t_3$ applied to one of its inputs, the other input being supplied by the continuing voltage signal on the line 106'.

The character comparison unit 80, to be described in detail later with reference to FIG. 12, compares the basic code elements released from the basic code interpretation unit with the coded signals entered from the directory selector 74 to ascertain whether or not there is a match between the said two codes.

If there is no match the magnetic tape drives on and the above mentioned process is repeated for as many times as necessary for a match to occur. When this happens the character comparison unit 80 produces an output signal on the line 80' (FIG. 6) which causes the magnetic tape to be stopped and a bistable in the page counter 81 to be triggered. The said bistable thereafter supplies a continuing voltage signal along the line 81' (FIG. 6) to the control code interpretation unit 78 and the basic code interpretation unit 79.

This continuing voltage signal is applied on a line 112 in the circuit of the basic code interpretation unit.

A coincidence gate 113 is provided to ensure that the gates 108 (*a*) – (*e*) are inhibited until the relevant directory has been found. The gate 113 supplies a signal along a line 113' to the gate 107 when the continuing voltage signals on the lines 106' and 112 are absent.

The page counter signals are produced by a coincidence gate 114 when the voltage signal on the line 112 is present for every timing pulse $t_4$ occurring while the relevant page is being selected. The counting pulses are supplied along a line 114' to the counter of the page counter 81 (FIG. 6).

The page marker signals are supplied by a coincidence gate 115 to the page counter 81 along a line 115'. These pulses occur whenever a page marker code having basic code elements "11111" are detected by the gates 99, 100 and 101. In this case the gate 101 produces a pulse on the line 101' which is supplied to a coincidence gate 116. In conjunction with the voltage signal on the line 112 this pulse passes through the gate 116 and is supplied on a line 116' to the gate 115 which, at the occurrence of a timing pulse $t_1$ produces a page marker signal on the line 115'. The output from the gate 116 is also applied to inhibit the gate 114 which then ceases to supply page count signals on the line 114'.

The voltage signal on the line 112 is also applied to an INVERT gate 117 the output from which inhibits the gate 113. Thus, the inhibition placed on the gates 108(*a*) – (*e*) due to the gate 113 is thereby lifted.

Outputs from the gates 102 and 103 are supplied, respectively, on lines 102' and 103' to the punctuation inhibition unit 86 (FIG. 6). An output on the line 102' indicates that a basic code representing a fullstop has been detected, and an output on the line 103' indicates that a basic code representing an oblique stroke has been detected.

The matching control unit is shown in FIG. 9 and includes a counter 118. When the system is ready to accept the first of the page index codes on the magnetic tape the counter 118 supplies a continuing voltage on a line 118' which is supplied to the position comparison unit 83 (FIG. 6). The voltage signal on the line 118' indicates that a match is required at the first index letter position. As soon as an index letter has been matched at the first index letter position the character comparison unit 80 supplies the pulse on the line 80'' (FIG. 6) which enters the circuit of the matching control unit on a line 119. The pulse on the line 119 passes through an OR gate 120 and is supplied on a line 120' to step the counter 118. Once the counter 118 has stepped the voltage signal on the line 118' is removed and a continuing voltage signal is supplied along a line 118'' to the position comparison unit 83 to indicate that a match is required at the second index letter position.

Two situations may now arise in which the counter 118 is stepped on. The first situation arises when, as before, a letter has been matched at the second index letter position and the character comparison unit 80 supplies a pulse received on the line 119 which thereafter steps the counter. The second situation arises when the A comparison unit 85 (FIG. 6) detects that the index letter at the second index letter position is capital A, in which case the A comparison unit 85 supplies a pulse on the line 85' which is received by the matching control unit along a line 121. The pulse on the line 121 passes through the gate 120 and along the line 120' to step the counter 118.

In both these cases, when the counter 118 has been stepped the voltage signal on the line 118'' disappears and a continuing voltage signal indicating that a match is required at the third index letter position is supplied along a line 118''' to the position comparison unit 83.

Providing that by this time a page has not been determined a pulse will appear on either of the lines 119, 121 to step the counter 118 in the usual manner. At this point the index letters appearing at the first three index letter positions must have been matched and the continuing voltage signal appearing on a line 118'''' produced when the counter 118 steps indicates that there is a complete match at all three index letter positions. The signal voltage on the line 118'''' is supplied to an input of a coincidence gate 122 and at the occurrence of a timing pulse $t_5$ a pulse is supplied along a line 122' to the page counter 81 (FIG. 6). The signal on the line 122' indicates that a page has been determined and serves to stop the page count. Further, in conjunction with the signal on the line 120' the voltage signal on the line 118'''' causes a coincidence gate 123 to produce a pulse on a line 123' which triggers a bistable 124 which thereafter supplies a continuing voltage signal on a line 124' serving as a continuation indication. The signal indicating a complete match on the line 118'''' is also supplied by a line 118''''' to the position comparison unit 83.

If, at any time during the above sequence, a page has been determined, then the matching control unit will be reset to its initial condition.

The position comparison unit 83 (FIG. 6) is shown in FIG. 10. The continuing voltage signals appearing on the lines 118', 118'', 118''' and 118''''' of the matching control unit (FIG. 9) are supplied to the position comparison unit, respectively, on lines 125, 125', 125'' and 125'''.

The continuing voltage signals from the control code interpretation unit appearing on lines 91', 92' and 93' (FIG. 7) are applied, respectively, to the position comparison unit on lines 126, 126' and 126''.

When signals appear on the lines 125 and 126 indicating, respectively, that a match is required at the first index letter position, and that the first index letter position has been detected, then these two signals are supplied to a coincidence gate 127 and at the occurrence of a timing pulse $t_2$ the gate 127 produces a pulse on a line 127' indicating that the first index letter position has been matched. The pulse on the line 127' is supplied to the letter release unit 82 (FIG. 6) which then releases the encoded signals of the first index letter of the specific name to the character comparison unit 80.

When a match has eventually been made the counter 118 (FIG. 9) of the matching control unit produces the continuing voltage signal on the line 118'' which is received on the line 125' of the position comparison unit and is supplied to a coincidence gate 128 together with the voltage signal on the line 126. The gate 128 produces an output pulse on a line 128' which is supplied to a coincidence gate 129 which, in conjunction with a timing pulse $t_3$ produces an output pulse on a line 129' which causes the letter release unit 82 to release the coded signals of the letter at the second index letter position of the specific name to be released to the A comparison unit 85 (FIG. 6). The A comparison unit remains inoperative unless the index letter at the second index letter position is capital A. In this case the A comparison unit will produce an output pulse applied to the line 121 (FIG. 9) of the matching control unit and will cause the counter in this unit to step thereby to produce a continuing voltage signal on the line 118''' indicating that a match is required at the third index letter position.

If the second index letter is not capital A the voltage signal on the line 125', in conjunction with a voltage signal on the line 126' causes a coincidence gate 130 to produce an output pulse on a line 130'. This pulse is supplied to the letter release unit 82 (FIG. 6) and causes this unit to release the coded signals representing the second index letter of the specific name to be released to the character comparison unit 80 for comparison with the basic code elements in the normal manner.

Providing that, at this stage, a page has not been determined the sequence continues with a signal being provided on the line 125'' from the matching control unit which, in conjunction with the voltage on the line 126' causes another coincidence gate 131 to produce an output pulse on a line 131'. In turn this pulse is applied to a coincidence gate 132 which, in conjunction with a timing pulse $t_3$ produces a pulse which causes the coded signals of the letter appearing at the third index letter position of the specific name to be released to the A comparison unit 85. If the letter at the third index letter position is not capital A then a coincidence gate 133 operates in a manner similar to that of the gate 130 to produce a pulse on a line 133' which causes the letter release unit 82 to release the coded signals of the third index letter to the character comparison unit 80. The pulse on the line 133' is supplied to the letter release unit by an OR gate 134.

A coincidence gate 135 is provided for circumstances in which there may be a continuation page so that the letter release unit 82 may release coded signals representing the third index letter to the character comparison unit 80 for a second time.

If, at any time during this sequence, an index letter position is detected which is higher than that to be matched then one of coincidence gates 136, 137 and 138 will be operative to supply a pulse indicating that a page has been determined via an OR gate 139 to the page counter 81 (FIG. 6).

The letter release unit 82 (FIG. 6) is shown in FIG. 11. The coded signals representing the index letters at the first, second and third index letter positions are initiated by the keyboard 72 and are supplied via the character interpretation unit 73 (FIG. 6) respectively on lines 140, 141 and 142 to three sets of bistables 143, 144 and 145. Each bistable set contains five bistables in all since each of the coded signals is constituted by a total of five bits.

The bistable sets 143, 144 and 145 register the respective coded signals as they arrive.

When the position comparison unit matches the first index letter position it produces a pulse on the line 127′ (FIG. 10) which is supplied along a line 146 of the letter release unit. The pulse on the line 146 enables a set of five coincidence gates 147 to pass the coded signals representing the first index letter of the specific name along a line 143′ to a line 147′. These signals then pass through an OR gate 148 and are thereby released to the character comparison unit 80 (FIG. 6).

The pulse appearing on the line 129′ (FIG. 10) is applied to the letter release unit on a line 149, and this pulse enables a coincidence gate 150 to pass the coded signals representing the letter at the second index letter position of the specific name along a line 150′ to an OR gate 151. From this gate the signals pass along a line 151′ to the A comparison unit 85 (FIG. 6).

Similarly pulses appearing on the lines 130′ and 132′ of the position comparison unit are applied, respectively, on lines 152 and 153.

The pulse appearing on the line 152 enables a set of coincidence gates 154 to pass coded signals representing the letter at the second index letter position along a line 154′ and thence via the gate 148 to the character comparison unit.

The pulse appearing on the line 153 enables a set of five coincidence gates 156 to pass coded signals representing the letter at the third index letter position along a line 156′ and thence via the gate 151 along the line 151′ to the A comparison unit.

The pulse originating from the gate 135 (FIG. 10) and passing through the gate 134 is applied to the letter release unit along a line 157, and thereafter coded signals representing the letter appearing at the third index letter position of the specific name are allowed to pass through a gate 158 along a line 158′ to the character comparison unit via the gate 148.

Additionally the coded signals of the letters appearing at the first and second index letter positions are supplied, respectively, by lines 143″ and 144′ to the punctuation inhibition unit 86. Further, the coded signals representing the index letter at the third index letter position are used as control signals, supplied along a a line 145′, to restart the magnetic tape.

The character comparison unit 80 (FIG. 6) is shown in FIG. 12. This figure also incorporates the punctuation inhibition unit 86 indicated by that section bounded by a broken line.

The coded signals of the index letters appearing at the three index letter positions of the specific name are released into the character comparison unit from the letter release unit, in parallel, along lines 159 (*a*) – (*e*).

The elements constituting the coded signals of the relevant directory are released into the character comparison unit from the directory selector 74 (FIG. 5) in parallel along lines 160 (*a*) – (*e*).

The basic code elements from the basic code interpretation unit 79 are released into the character comparison unit along lines 161 (*a*) – (*e*).

The directory serial number release signal originating on the line 109′ (FIG. 8) from the basic code interpretation unit 79 is applied to the character comparison unit along a line 162. On receipt of this signal coincidence gates 163 (*a*) – (*e*) are enabled and any elements indicative of the required directory appearing on the lines 160 (*a*) – (*e*) are passed, respectively, through the gates 164 (*a*) – (*e*) to OR gates 165 (*a*) – (*e*).

Each of the OR gates 165 (*a*) – (*e*) are connected to a set of three coincidence gates. For the sake of clarity only two such sets are shown namely, those connected by a line 166 to the gate 165 (*e*) and those connected by a line 167 to the gate 165 (*a*). The first set is constituted by coincidence gates 168, 169 and 170 and the second set is constituted by coincidence gates 171, 172 and 173.

It will be apparent that similar sets are provided in respect of the gates 165 (*e*) – 165 (*b*), and their respective connections will be apparent to one skilled in the art.

When the character comparison unit is comparing to find a match between the coded signals constituting the required directory number on the lines 160 (*a*) – (*e*) and the basic code elements released from the magnetic tape, these latter elements arriving on the lines 161 (*a*) – (*e*), there must be a complete match between the said two codes at corresponding bit positions of which there are five in all.

Initially detection is made by the gates 169 and 170. If the codes each have a "0" at the fifth bit position then the gate 170 will produce an output indicating that this is so and a pulse will pass through an OR gate 174 to a coincidence gate 175. If, on the other hand, the codes each have a "1" at the fifth bit position then the gate 169 will produce an output indicating that this is so and a pulse will pass through the OR gate 174 to the coincidence gate 175.

Detection is then made in respect of the fourth bit position by the set of three gates (not shown) connected with the gate 165 (*d*). If a match is made in this case then the gate 175 will produce an output on a line 175′ indicating that the elements of the said two codes are equal at the fifth and fourth bit positions.

The cycle progresses through the coincidence gates 176, 177 and 178. If the fifth to the second inclusive bit positions are equal and a signal from an OR gate 179 indicates that the bits are equal at the first bit position, then the gate 178 will produce a signal on a line 178′ indicating that there is a complete match.

The signal on the line 178′ is supplied to one input of a gate 179 which is enabled by the signal on the line 162. The gate 179 is then operable to produce a signal on a line 179′ indicating that the relevant directory has been found.

As previously mentioned when coded signals representing the index letters of the specific name are released from the letter release unit 82 (FIG. 6) they enter the character comparison unit on the lines 159 (*a*) – 159 (*e*). The coded signals have a total of five bit positions and the signal at the fifth bit position, appearing on the line 159 (*e*) is supplied to an input of the OR gate 165 (*e*). Similarly, signals at the fourth, third, second and first bit positions are supplied respectively to the OR gates 165 (*d*) – (*a*).

The coded signals are detected in parallel by the sets of gates 168, 169, 170, 174 . . . 171, 172, 173, 179. If the element at the fifth bit position of the basic code appearing on the line 160 (*e*) is greater than that for the fifth bit position of the coded signals, the gate 168 will produce an output pulse on the line 168' indicating that the page has been determined. This signal passes along the line 168' to an OR gate 180 and is supplied along a line 180' to a coincidence gate 181. Thence the signal passes along a line 181' and onto the page counter 81 (FIG. 6).

If the bits at the fifth bit position of the two said codes are equal the gate 169 or the gate 170 will pass a pulse to the gate 174 depending, respectively, on whether the bits are a "1" or a "0". This pulse is passed along a line 174' to the gate 175. If the signals at the fourth bit position of the said two codes are equal the gate 175 will produce an output on the line 175' indicating that this is the case. If, on the other hand, the set of gates associated with the gate 165 (*d*) detect that the basic code element at the fourth bit position is greater than that of the coded signal at the fourth bit position then a pulse will appear on a line 182 causing a gate 183 to produce an output pulse on a line 183' indicating that a page has been determined. The cycle progresses in respect of all the sets of gates and if a complete match between the said two codes is established then a gate 184 will produce a signal on a line 184' indicating that a letter has been matched. This signal is passed to the matching control unit 84 (FIG. 6).

The A comparison unit is indicated, on FIG. 12, by broken lines and comprises an OR gate 185 having an output connected by a line 185' to an input of a coincidence gate 186. The OR gate 185 is connected with the lines 159 (*b*) – (*e*), and the gate 186 is connected with the line 159 (*a*).

The coded signal representing the letter A is constituted by five bits "00001" and whenever this code group appears on the lines 159 (*a*) – (*e*) the gate 186, at the occurrence of a timing pulse $t_3$ will produce a pulse on a line 186' indicating that a letter has been matched with the letter A. The pulse on the line 186' is passed to the page counter 81 (FIG. 6).

FIG. 13 shows the punctuation inhibition unit.

When the letter release unit registers coded signals representing the index letter at the first index letter position of the specific name it produces a continuing voltage signal on the line 143'' (FIG. 11). This voltage signal enters the punctuation inhibition unit on a line 185 and is applied to an input of a coincidence gate 186 and to an input of another coincidence gate 187.

Similarly, when the letter release unit registers coded signals representing the index letter at the second index letter position of the specific name it produces a continuing voltage signal on the line 144' (FIG. 11). This voltage signal enters the punctuation inhibition unit on a line 188 and is applied to an input of a coincidence gate 189 and to an input of a coincidence gate 190.

When a fullstop "." occurs at the second or the third index letter position of the specific name the coded signals (initiated by the keyboard 72 (FIG. 5) ) are applied along a line 191 to the gates 186 and 189.

In a similar fashion when an oblique stroke "/" occurs at either the second or the third index letter position of the specific name the coded signals representing this punctuation symbol are applied along a line 192 to the gates 187 and 190.

When a fullstop "." occurs at the second index letter position the gate 186 supplies a pulse along a line 186' to trigger a bistable 193 which, in turn, supplies a continuing voltage signal on a line 193' to an OR gate 194.

In the case when an oblique stroke "/" occurs at the second index letter position the gate 187 applies a pulse along a line 187' to trigger a bistable 195. In turn the bistable 195 supplies a continuing voltage signal along a line 195' to the gate 194.

The output of the gate 194 is connected by a line 194' to a coincidence gate 196.

It is arranged that the gate 196 is inhibited when the matching control unit produces a voltage signal on the line 188' (FIG. 9) indicating that a match is required at the first index letter position. The signal on the line 188' enters the punctuation inhibit unit on a line 197.

When the counter118 (FIG. 9) of the matching control unit steps, the voltage signal on the line 118',and hence on the line 196, disappears so that the inhibition on the gate 196 is removed. The gate 196 then supplies a continuing voltage signal along a line 196' to an OR gate 198 and thence to the basic code interpretation unit via a line 198'.

This voltage signal serves to place an inhibition on the gates 108 (*a*) – (*e*) (FIG. 8) of the basic code interpretation unit so that basic code elements relating to subsequent index letters cannot be released until after a page index code has been reached which represents a page in the relevant directory that contains a name with, either a fullstop ".", or an oblique stroke "/", as the case may be, at the second index letter position.

Immediately the basic code interpretation unit has detected a basic code representing a punctuation symbol it produces a pulse on one of the lines 102', 103' (FIG. 8). A pulse on the line 102' indicates that a basic code representing a fullstop has been detected and this enters the punctuation inhibition unit on a line 199. A pulse on the line 103' indicates that a basic code representing an oblique stroke has been detected and this enters the punctuation inhibition unit on a line 200. The pulse on the line 199 is applied to coincidence gates 201 and 202, and that on the line 200 is applied to coincidence gates 203 and 204.

The pulse on the line 199, at this stage, will pass through the gate 201 and will be applied on a line 201' to the bistable 193. Thereafter the bistable 193 resets. Similarly, a pulse on the line 200 passes through the gate 203 and is applied via a line 203' to reset the bistable 195.

In either of these two cases the continuing voltage signal on the line 198' is removed so that the inhibition placed on the gates 108 (*a*) – (*e*) (FIG. 8) is removed thus permitting the basic code interpretation unit to release the basic code elements representing the punctuation symbol under consideration along the lines 110

(a) – (e) (FIG. 8) to the character comparison unit 80 (FIG. 6).

The occurrence of the punctuation symbols "." or "/" after the second index letter of the specific name is dealt with in this circuit by bistables 205 and 206, an OR gate and a coincidence gate 208 in conjunction with the gate 198. The operation of these circuit integers corresponds exactly with their counterparts dealing with the occurrence of punctuation symbols appearing after the first index letter of the specific name, and therefore, no detailed description of these integers will be given.

FIG. 14 shows the circuit diagram of the page counter.

When a relevant directory has been found the character comparison unit produces a pulse on the line 179′ (FIG. 12). This pulse enters the circuit of the page counter on a line 209 and triggers a bistable 210 to supply a continuing voltage signal on a line 210′. This voltage signal is supplied to the line 97 (FIG. 7) in the circuit of the control code interpretation unit. The signal is also supplied to the line 112 (FIG. 8) in the circuit of the basic code interpretation unit.

The pulse on the line 209 is also supplied, along a line 209′, to a counter 211, and on receipt of this pulse the counter 211 resets to zero.

Page counting pulses appearing on the line 114′ (FIG. 8) in the circuit of the basic code interpretation unit enter the circuit of the page counter on a line 212 and pass through a coincidence gate 213 where they are counted by the counter 211.

The page marker signals appearing on the line 115′ (FIG. 8) in the circuit of the basic code interpretation unit, enter the circuit of the page counter on a line 213. Each of these signals is produced at the occurrence of a timing pulse $t_1$ and triggers a bistable 214 hereinafter termed the "marker bistable".

The counter 211 is connected with a coincidence gate 215 by lines 211′, 211″ and 211‴, and this gate is enabled whenever there is a "carry" signal for each of the first three positions of the counter 211. This case obtains when a signal is present on each of the lines 211′, 211″ and 211‴. The gate 215 then produces an output pulse, along a line 215′, which triggers a bistable 216. The bistable 216 will hereinafter be termed the "carry bistable".

One input of a coincidence gate 217 is connected by a line 216′ with the ON position of the carry bistable 216. The other input of the gate 217 is connected with the OFF position of the marker bistable 214 by a line 214′. Another coincidence gate 218 is provided having one input connected with the OFF position of the carry bistable 216 by a line 216″ and another input connected with the ON position of the marker bistable 214 by a line 214″.

A page marker, constituted by a timing pulse $t_2$, is applied from the basic code interpretation unit along a line 219 to both the gates 217 and 218.

It will be apparent that, providing the page count and the page marker signals occur respectively at the occurrence of timing pulses $t_4$ and $t_1$, neither the gate 217 nor the gate 218 will be operative to produce output signals. However, if for any reason the page counter and page marker signals do not conform strictly to their correct sequence, then one of the gates 217, 218 will be enabled at the occurrence of the page carry check signal on the line 219. This signal will thereafter pass through an OR gate 220 and will pass along a line 220′ to trigger a bistable 221. Upon receipt of the signal on the line 220′ the bistable 221 produces a continuing voltage signal on a line 221′ which causes an alarm to be given indicating that the counter 221 is out of step with the page markers.

The carry and marker bistables 216 and 217 are reset at the occurrence of every timing pulse $t_3$ applied to the circuit on a line 222. This enables the said bistables to perform the check in respect of every page that is counted.

Whenever a page has been determined a signal will appear on one of three lines 223′, 223″ or 223‴. The line 223′ is connected with the line 181′ (FIG. 12) contained in the circuit of the character comparison unit. The lines 223″ is connected with the line 122′ (FIG. 9) in the circuit of the matching control unit, and the line 223‴ is connected with the line connected with the OR gate 139 (FIG. 10) contained in the circuit of the position comparison unit.

Whenever any of the signals are received they pass through an OR gate 224 and pass along a line 224′ to trigger a bistable 225. The bistable then produces a continuing voltage signal on a line 225′ which passes along a line 225″ to place an inhibition on the gate 213. Page counting signals on the line 212 are thereby prevented from entering the counter 211 and the page count is stopped.

The voltage signal on the line 225′ also serves to enable a set of coincidence gate 226 (a) – (e).

Thereafter, signals indentifying the page on which the specific name appears are released from the counter 211 along lines 211 (a) – (e) and pass through the gates 226 (a) – (e) to any device which is required to take action on these signals.

It will be apparent from the foregoing description of the second embodiment of the invention that whenever the directory with which it is used is reorganized as by deleting and introducing new key words or names, or altering the overall structure of the directory organization, it will be a comparatively simple task to make corresponding alterations to the page index codes on the magnetic tape.

In either of the two embodiments of the data locating device, when a relevant page has been determined signals indicating which page are produced at the output of the device. These signals can be used to control means associated with the data store for enabling the relevant page in the store to be reproduced on a presentation device. The presentation device may be, for example, a display screen, or, where visual indication is not required, the presentation device may comprise a set of earphones or a loud speaker by which an audible presentation of the names appearing on the relevant page may be given.

In the former case the pages of the data store may be comprised of frames of a micro-film each frame bearing a different group of names, and in the latter case the store may be comprised of magnetic drums each having a plurality of tracks. In this instance a different group of names will be recorded on respective tracks.

The section of the data store containing the pages can be associated with another section of the store containing respective particulars relating to all the stored names. The particulars may be recorded as coded signals on magnetic drums, each set of particulars being referenced by a group of coded signals.

Upon establishing a presentation of the required page as by a projection of one of the micro film frames, or as an audible readout of the list of names on the relevant page, a device may be actuated once the relevant name on the page is located to initiate a series of coded signals uniquely indicative of that name. These signals may be compared with the said referencing signals in that section of the store containing the particulars until a match has been made, whereupon the particulars relating to the specific name are presented, again as a visual presentation or as an audible presentation.

What is claimed is:

1. A data locating device for locating specific data from a store of data organized under a plurality of keywords arranged in a predetermined sequence, the device comprising:

means for producing a plurality of electrical signals representing at least two successive characters of a keyword under which the said specific data is held in said data store, and means for combining the electrical signals and, responsive to said combination, for producing a group of electrical signals representative of the location of the said specific data in said data store, said means for combining comprising a coded matrix circuit consisting of a plurality of interconnected gates coded in correspondence with the organization of the said data store, the gates being arranged in a plurality of sets, each set being in a separate section of the matrix circuit, an output side of at least one gate in a first set being connected with an input side of at least one gate in a second set, the gates in the first and second sets being connected for receiving, respectively, the signals representing said first and second successive characters, thereby causing the gates in the first set to receive signals representing the first character, which signals are passed by said at least one gate in the first set to said at least one gate in the second set for combination with the signals representing the second character received by the gates in the second set, whereupon the combined signals are supplied to an output of the said device and serve to represent the location of the specific data in the data store, optionally after such combined signals have been routed through at least one further section comprising a third set of gates for combination with signals representing at least one further of said successive characters.

2. A device for automatically generating electrical signals representing the location of desired data elements within a data store which is organized in a predetermined sequence, said device comprising:

means for sequentially generating first electrical signals representing successive characters of a keyword corresponding to said desired data element, and means for sequentially analyzing said first signals with respect to said predetermined sequence within a similarly organized directory and for logically effectively combining successive ones of said first signals in response thereto for producing second electrical signals representing the location of said desired data within said organized data store, said first-mentioned means comprising:

keyboard means for generating character representing signals, directory selector means for receiving event representing signals and for selecting a particular one of a plurality of available directories in response thereto, and character interpretation means connected to said keyboard means for routing some of said character representing signals to said directory selector means as said event representing signals and for routing others of said character representing signals to said means for sequentially analyzing.

3. A device for automatically generating electrical signals representing the location of desired data elements within a data store which is organized in a predetermined sequence, said device comprising:

means for sequentially generating first electrical signals representing successive characters of a keyword corresponding to said desired data element, and means for sequentially analyzing said first signals with respect to said predetermined sequence within a similarly organized directory and for logically effectively combining successive ones of said first signals in response thereto for producing second electrical signals representing the location of said desired data within said organized data store, said last-mentioned means comprising:

a plurality of ordered sets of logic gates interconnected to represent said directory organized in said predetermined sequence, an input to at least one of a first set of said gates being connected to receive said first electrical signals representing a first letter in said keyword, an output from said at least one gate in the first set being connected as an input to at least one of a second set of said gates which is also connected to receive said first electrical signals representing a second letter in said keyword, and an output from at least one gate in a last one of said sets of gates being connected to provide said second electrical signals.

4. A device for automatically generating electrical signals representing the location of desired data elements within a data store which is organized in a predetermined sequence, said device comprising:

means for sequentially generating first electrical signals representing successive characters of a keyword corresponding to said desired data element, and means for sequentially analyzing said first signals with respect to said predetermined sequence within a similarly organized directory and for logically effectively combining successive ones of said first signals in response thereto for producing second electrical signals representing the location of said desired data within said organized data store, said last-mentioned means comprising:

directory data reading means for providing successive coded signals representing successive ordered individual characters of predetermined keywords in said directory which is organized according to said predetermined sequence, code interpretation means for decoding said coded signals, and character comparison means connected to said code interpretation means for successively comparing like ordered position of the decoded signals representing individual ordered characters of the predetermined directory keywords with similar signals representing individual characters of the desired keyword, said character comparison means indicating when a match has occurred or when the compared desired keyword character has a greater sequence value than the corresponding directory keyword character to provide start/stop control signals to said directory data reading means whereby the desired portion of the directory is located.

5. A device for automatically generating electrical signals representing the location of desired data within a data store, the contents of said store being organized in a predetermined sequence of successive characters of a plurality of keywords and being arranged in sections each of which contains data relating to one or more keywords, said device comprising:

means for sequentially generating first electrical signals representing one or more successive characters of a keyword corresponding to said desired data, indexing means organized similarly to said contents of said data store and presenting coded indentities indicative of the content of each respective said section, means for associating said first electrical signals with the coded indentities of successive sections to determine by comparison which of said sections hold or holds said desired data, and means connected with said associating means for producing second electrical signals in response to said comparison representing the location of said desired data within said organized data store.

6. A device according to claim 5 wherein said indexing means comprises:

a coded matrix circuit consisting of a plurality of interconnected gates coded in correspondence with the organization of the said data store.

7. A data locating device for locating specific data from a store of data organized in a predetermined sequence under a plurality of keywords arranged in a predetermined sequence and being arranged in sections, each of which contains data relating to one or more keywords, the device comprising:

means for producing a plurality of electrical signals representing at least two successive characters of a keyword under which the said specific data is held in said data store, and means for combining the electrical signals and, responsive to said combination, for producing a group of electrical signals representative of the location of the said specific data in said data store, said combining means comprising indexing means for producing a plurality of groups of coded signals corresponding respectively to keywords contained on successive ones of the said sections of the said data store, and means operably connected with said indexing means for successively relating the groups of coded signals with said electrical signals representing the said successive characters of the keyword and for producing electrical signals representing the location of the specific data in the data store when a said coded signal group matches said signals representing said successive characters.

8. A data locating device according to claim 7 wherein:

said relating means comprises a register for storing the signals representing the said successive characters, detecting means for detecting control code elements and basic code elements of said groups of coded signals, counting means for counting said groups of coded signals as they are successively produced by said indexing means, comparison means for comparing said basic code elements of said groups of coded signals with said signals representing said successive characters, and control means, said control means being responsive to an output signal provided by said control code element detecting means upon detection of control code elements of a said group of signals to release said signals representing a first of said successive characters to said comparison means, said comparison means then being operable to compare the said signals representing said first character with said basic code elements of the said group of coded signals, the control code elements of which were detected by said control code element detecting means, and thereafter to compare similarly signals representing at least said second of said successive characters with subsequent basic code elements.

9. A data locating device according to claim 8 wherein the control code elements signify the position at which the character represented by the following basic code elements appears in a given keyword, said control code element detecting means supplying an output signal upon detection of each new position, the said signal uniquely representing that position, and wherein said control means comprises a first circuit for receiving said position signals and a second circuit, operably connected with the first circuit, for receiving signals from said comparison means produced thereby whenever a match is made between the coded signals representing one of the said successive characters and the basic code elements of one of said groups of coded signals, said second circuit being adapted to supply an output signal whenever a match has been made which identifies the position at which the match has been made, said first circuit being adapted to respond both to the signals indicating that a new position has been detected and to the signal identifying the position at which a match has been made either to produce a pulse for controlling said register to release encoded signals representing the next successive character to said comparison unit or, if the next detected position is previous to the next position to be matched, to produce a signal indicating that the required page has been determined.

10. A data locating device according to claim 8 wherein said register includes inhibiting means comprising a set of bistables for receiving and storing encoded signals representing punctuation symbols and a plurality of gates for inhibiting the release of basic code elements representing characters of a keyword from said basic code element detecting means to said comparison means until after said basic code detecting means receives basic code elements indicative of a keyword containing the said punctuation symbols.

11. A data locating device according to claim 8 wherein said comparison means comprises a plurality of gates adapted to compare coded signals representing said successive characters with basic code elements of said groups of coded signals at corresponding bit positions and as a result of said comparison being operable to supply a signal indicating that a page has been determined when the binary value of the basic code is greater than that of the coded signal, or to supply a signal indicating that a letter has been matched when the binary value of the basic code equals that of the coded signal, or to remain inoperative when the binary value of the basic code is less than that of the coded signal.

12. A data locating device according to claim 8 wherein said counting means includes a counter stepped each time basic code elements are released from said basic code element detecting means to said comparison means, first and second switching circuits, and a gating circuit operably connected with said switching circuits, the first switching circuit being set to a predetermined condition in dependence on the stepping of the counter and the second switching circuit being adapted for receiving page marker signals and being set to a predetermined condition upon receipt of each of said marker signals, the arrangement being such that whenever said conditions are not set up simultaneously the gating circuit produces an alarm indicating an incorrect operating sequence of the data locating device.

* * * * *